United States Patent
Kobayashi et al.

(10) Patent No.: US 8,491,195 B2
(45) Date of Patent: Jul. 23, 2013

(54) ROLLING BEARING DEVICE

(75) Inventors: Takuji Kobayashi, Kuwana (JP); Masatsugu Mori, Kuwana (JP)

(73) Assignee: NTN Corporation, Osaka (JP)

( * ) Notice: Subject to any disclaimer, the term of this patent is extended or adjusted under 35 U.S.C. 154(b) by 651 days.

(21) Appl. No.: 12/733,303

(22) PCT Filed: Aug. 19, 2008

(86) PCT No.: PCT/JP2008/002238
§ 371 (c)(1),
(2), (4) Date: Feb. 23, 2010

(87) PCT Pub. No.: WO2009/028151
PCT Pub. Date: Mar. 5, 2009

(65) Prior Publication Data
US 2010/0202720 A1     Aug. 12, 2010

(30) Foreign Application Priority Data
Aug. 24, 2007   (JP) .................. 2007-218734
Jun. 20, 2008   (JP) .................. 2008-162439

(51) Int. Cl.
*F16C 33/66*   (2006.01)
*F16C 19/00*   (2006.01)

(52) U.S. Cl.
USPC ........... 384/474; 384/462; 384/466; 384/473; 384/606

(58) Field of Classification Search
USPC .............. 384/462, 466–468, 474, 476, 606, 384/473; 184/39.1, 55.1, 6.1, 6.14, 6.26, 184/7.4, 108; 417/490
See application file for complete search history.

(56) References Cited

U.S. PATENT DOCUMENTS

| | | | | |
|---|---|---|---|---|
| 4,167,297 A * | 9/1979 | Cheesman | ............. | 384/474 |
| 5,253,985 A * | 10/1993 | Ruetz | ............. | 417/407 |
| 5,306,565 A | 4/1994 | Corbin et al. | | |
| 5,429,998 A | 7/1995 | Someno et al. | | |
| 6,105,724 A * | 8/2000 | Stitz et al. | ............. | 184/7.4 |
| 6,328,478 B1* | 12/2001 | Fukuda et al. | ............. | 384/475 |
| 6,398,509 B1* | 6/2002 | Okazaki et al. | ............. | 417/44.1 |
| 6,874,942 B2 | 4/2005 | Yamamoto et al. | | |
| 7,374,019 B2* | 5/2008 | Kosugi et al. | ............. | 184/6.14 |

(Continued)

FOREIGN PATENT DOCUMENTS

| | | |
|---|---|---|
| EP | 0 477 755 | 4/1992 |
| JP | 5-148052 | 6/1993 |
| JP | 6-199508 | 7/1994 |
| JP | 11-132244 | 5/1999 |

(Continued)

OTHER PUBLICATIONS

Chinese Office Action dated Feb. 2, 2012 issued in corresponding Chinese Patent Application No. 200880104081.2.

(Continued)

*Primary Examiner* — Marcus Charles

(57) ABSTRACT

A rolling bearing device includes a rolling bearing unit having rolling elements retained by an annular retainer and intervening between raceways of inner and outer rings, and a nozzle member provided proximate to the outer ring. The nozzle member is provided with an annular collar portion inserted in a bearing space delimited between the inner ring and the outer ring and having a nozzle hole. This collar portion has an outer diametric surface in the form of a retainer guide surface, and an inner diametric surface of the retainer is guided by this retainer guide surface.

15 Claims, 12 Drawing Sheets

U.S. PATENT DOCUMENTS

| | | | |
|---|---|---|---|
| 7,819,587 B2 * | 10/2010 | Akamatsu et al. | 384/462 |
| 2002/0009245 A1 * | 1/2002 | Sugita et al. | 384/466 |
| 2002/0102040 A1 * | 8/2002 | Koiwa et al. | 384/474 |
| 2005/0252722 A1 * | 11/2005 | Kosugi et al. | 384/462 |

FOREIGN PATENT DOCUMENTS

| | | |
|---|---|---|
| JP | 2002-89573 | 3/2002 |
| JP | 2002-139032 | 5/2002 |
| JP | 2004-100890 | 4/2004 |
| JP | 2006-300323 | 11/2006 |
| JP | 2006-329233 | 12/2006 |
| JP | 2008-286270 A * | 11/2008 |

OTHER PUBLICATIONS

English Translation of the International Preliminary Report on Patentability mailed Mar. 18, 2010 in corresponding International Patent Application PCT/JP2008/002238 (9 pages).

Chinese Office Action issued Aug. 13, 2012 in corresponding Chinese Patent Application No. 200880104081.2

"Precision Rolling Bearing Devices," NTN Brochure, CAT. No. 2260-II/J, Mar. 3, 2006, 4 pages.

"Ceramic Rolling Bearing," Journal of Japan Society for Precision Engineering, vol. 54, No. 7, 1988, pages 1240-1244.

"Ceramic Bearings for Machine Tool Spindles," Koyo Engineering Journal, No. 135, 1989, pp. 62-71.

International Search Report for PCT/JP2008/002238, mailed on Oct. 21, 2008.

Chinese Office Action issued May 11, 2011 in corresponding Chinese Patent Application 200880104081.2.

Japanese Office Action issued Nov. 20, 2012 in corresponding Japanese Patent Application No. 2008-162439.

* cited by examiner

ROLLING BEARING DEVICE

CROSS REFERENCE TO THE RELATED APPLICATIONS

This application claims the benefit under 35 U.S.C. Section 371 of PCT International Application No. PCT/JP2008/002238, filed Aug. 19, 2008, which claimed priority to Japanese patent applications No. 2007-218734, filed Aug. 24, 2007, and No. 2008-162439, filed Jun. 20, 2008, the entire disclosures of which are herein incorporated by reference as a part of this application.

BACKGROUND OF THE INVENTION

1. Field of the Invention

The present invention relates to a rolling bearing device that is used in supporting a high speed spindle employed in, for example, a machine tool spindle device.

2. Description of the Related Art

The guide system in the retailer employed in a rolling bearing device has been known in three types; an outer ring guide system, an inner ring guide system and a rolling element (ball or roller) guide system. In the machine tool spindle device, the rolling bearing device is largely employed with an inner ring used as a rotating member and, therefore, with the retainer of the inner ring guide system, a lubricant oil is difficult to be retained on a guide surface due to a centrifugal force. Accordingly, in terms of lubricity, the machine tool spindle device largely make use of rolling bearing devices employing the retainer of the outer ring guide system or the rolling element guide system. On the other hand, in the case of the rolling bearing device utilizing the retainer of the rolling element guide system, the retainer tends to considerably fluctuate during rotation. In this respect, since in the rolling bearing device utilizing the retainer of the outer ring guide system, the rotator fluctuation of the retainer can be suppressed by the outer ring, the use of the rolling bearing device utilizing the retainer of the outer ring guide system (such as disclosed in the Patent Document 1 listed below) as a bearing for the machine tool spindle device brings about such an advantage found in stability of movement of the retainer and also in securement of the lubricant oil on the guide surface particularly during a high speed rotation.

Also, as a rolling bearing device designed to cope with a high speed feature of the machine tool spindle device, the rolling bearing device (such as disclosed in, for example, the Non-Patent Document 1 listed below) has been suggested, in which an inner ring has an outer diametric surface provided with an inclined surface portion and a nozzle member having a nozzle for injecting an air-oil, which is a mixture of a conveyance air with a lubricant oil, is laid along the inclined surface portion with a gap intervening between it and the inclined surface portion to represent an environmentally friendly lubricating structure. In the case of this lubricating structure, the lubricant oil jetted from the nozzle can be guided along the outer diametric surface of the inner ring towards the inside of the bearing device and, therefore, as compared with the case with the standard air-oil supply such as the direct discharging of the air-oil from the gap between the retainer and the raceway towards the rolling elements, the silencing property is excellent and the amount of both of air and oil consumed can be advantageously minimized.

In addition, the Non-Patent Documents 2 and 3 listed below describe a high speed orientation of the rolling bearing device. In particular, the Non-Patent Document 2 discloses the rolling bearing device utilizing such a material as fine ceramics, particularly silicon nitride ($Si_3N_4$). For use in the machine tool spindle device, the Non-Patent Document 2 also discloses formation of the rolling elements or raceway rings with the use of silicon nitride. On the other hand, the Non-Patent Document 3 discloses the rolling bearing device for the machine tool spindle device, in which silicon nitride ($Si_3N_4$) is used as a material. For example, examples in which only the rolling elements, both of the rolling elements and the inner ring or both of the rolling elements and the inner and outer rings are made of a ceramic material are disclosed in FIG. 2 in the Non-Patent Document 3.

[Patent Document 1] JP Laid-open Patent Publication No. 2006-329233
[Non-Patent Document 1] NTN Brochure, "Precision Rolling Bearing Devices", CAT. No. 2260/J, pp 53
[Non-Patent Document 2] Journal of Japan Society for Precision Engineering, Vol. 54, No. 7, 1988, pp 1240-1244
[Non-Patent Document 3] Koyo ENGINEERING JOURNAL No. 135, 1989, pp 62-71

SUMMARY OF THE INVENTION

In the case of the rolling bearing device utilizing the outer ring guiding retainer disclosed in the Patent Document 1 referred to above, the guide gap between the outer ring and the retainer is generally in the order of $1/10$ mm, but the guide gap referred to above is desirably set to a value as small as possible in order to secure the stability of the retainer movement. However, during the high speed rotation, the guide gap tends to become smaller than that during the standstill condition because of the influence brought about by heat emission and centrifugal force. In recent years, it is quite often that the retainer is molded of a resinous material, but the resinous material has a large linear coefficient of expansion and a small modulus of vertical elasticity as compared with those of a steel material used to form the outer ring and, therefore, the guide gap becomes small. As a result, there is the possibility that guide surfaces may contact directly with each other without any oil film intervening therebetween, resulting in disturbance to the normal operation of the bearing device, hence constituting an obstruction to the optimum design choice.

Even in the case of the rolling bearing device utilizing the lubricating structure for injecting the air-oil, such as disclosed in the Non-Patent Document 1 referred to above, the retainer employs the outer ring guide system or the rolling element guide system and, therefore, a problem similar to that discussed in connection with the rolling bearing device disclosed in the Patent Document 1 referred to above will occur if the outer ring guide system is employed. Also, when the rolling element guide system is employed in the retainer, problems similar to discussed above will be apt to occur such as, for example, increase of the rotator fluctuation of the retainer and/or damage to retainer pockets as a result of interference with the rolling elements.

The Non-Patent Documents 2 and 3 referred to above describe improvement in bearing rigidity and high speed rotating performance which is accomplished by the use of silicon nitride as a material for the rolling bearing elements (such as rolling elements and/or inner and outer raceway rings). However, for the high speed rotation, the bearing device as a whole will not accommodate a high speed feature unless the guide system in the retainer is of a structure compatible with a high speed rotation.

An object of the present invention is to provide a rolling bearing device designed to accomplish a stabilized retention of the retainer during a high speed rotation, to avoid a direct contact between guide surfaces and to reduce the power loss between guide gaps in the retainer.

Another object of the present invention is to provide the rolling bearing device of the type discussed above, which is excellent in high speed rotating performance.

The rolling bearing device of the present invention is a rolling bearing device which includes a rolling bearing unit including an inner ring and an outer ring both formed with respective raceways, rolling elements retained by an annular retainer and interposed between respective raceways in the inner and outer rings, and a retainer that retains the rolling elements; and a nozzle member provided in the vicinity of the outer ring; in which the nozzle member is provided with an annular collar portion having a nozzle hole defined therein for a lubricant and being inserted in a bearing space delimited between the inner ring and the outer ring, and the collar portion has an outer diametric surface in the form of a retainer guide surface for guiding an inner diametric surface of the retainer.

According to this construction described above, since the guide system employed in the retainer is not the rolling element guide system, but the system in which the guide is accomplished through the annular collar portion, it is possible to avoid such problems as an undesirable increase of the rotator fluctuation of the retainer and damage to the retainer pockets brought about by interference with the rolling elements.

Also, the change in guide gap amount resulting from a high speed rotation tends to increase and it is possible to assuredly avoid the direct contact in which no oil film intervene between guide surfaces (a retainer guide surface of the collar portion of the nozzle member and an inner diametric surface of the retainer).

In addition, with the guide system for the retainer in this case, since a sliding speed is low at the guide surface as compared with the outer ring guide system, the bearing power loss is small and the bearing temperature can be suppressed correspondingly, with an advantage found in terms of a preload control.

As a result, it is possible to achieve a stabilized retention of the retainer during the high speed rotation, to avoid the direct contact between the guide surfaces and to reduce the power loss between the retainer guide gaps.

In one embodiment of the present invention, the inner ring may have the outer diametric surface formed with an inclined surface portion having a large diameter on the side of the raceway, and the nozzle hole provided in the collar portion of the nozzle member is formed so as to discharge the lubricant in a direction towards the inclined surface portion of the inner ring. In the case of this construction, the lubricant discharged from the nozzle hole towards the inclined surface portion of the inner ring is guided into the bearing device along the inclined surface portion of the inner ring by the effect of a centrifugal force, developed as a result of rotation of the inner ring, and a surface tension, and, therefore, introduction of the lubricant into the bearing device can be accomplished smoothly.

In one embodiment of the present invention, the nozzle hole provided in the collar portion of the nozzle member may be formed so as to discharge the lubricant in a direction towards the inner diametric surface of the retainer. In the case of this construction, by the lubricant discharged from the nozzle hole, the guide gap formed between the retainer guide surface in an outer diametric surface of the collar portion and the inner diametric surface of the retainer can be lubricated.

In one embodiment of the present invention, the nozzle hole may be provided with a restrictor portion. In the case of this construction, the guide gap formed between the retainer guide surface, which is an outer diametric surface of the collar portion, and the inner diametric surface of the retainer can be constructed as a static pressure bearing unit of a constant pressure type, not as a dynamic pressure bearing unit, and because of the static pressure bearing effect thereof, the retainer can be stably guided by the effect of a fluid lubricating function even when the bearing rotating speed is low.

In one embodiment of the present invention, the outer diametric surface of the inner ring may be rendered to be an inclined surface portion and an inner diametric surface of the collar portion includes an inclined surface extending along the outer diametric surface of the inner ring. In the case of this construction, although a minute gap is formed between the inclined surface portion of the inner diametric surface of the collar portion and the inclined surface portion of the outer diametric surface of the inner ring, the lubricant tending to flow outwardly from the bearing device through this minute gap can be returned to the inside of the bearing device and be efficiently used for lubrication by the effect of the surface tension occurring in the inner ring inclined surface portion and the inner diametric inclined surface portion of the nozzle member collar portion and the centrifugal force.

In one embodiment of the present invention, the nozzle member may be provided with a plurality of the nozzle holes at respective circumferential locations in the collar portion. In the case of this construction, since the lubricant can be uniformly introduced in a circumferential direction within the bearing device, the lubricating capability increases. Where the lubricant is to be discharged from the nozzle hole towards the inner diametric surface of the retainer, the lubricant is discharged uniformly over the entire circumference of the inner diametric surface of the retainer and, therefore, the retainer can be guided with good balance.

In one embodiment of the present invention, the lubricant discharged from the nozzle hole of the nozzle member may be an air-oil. In the case of the air-oil, lubrication with a small quantity can be easily achieved.

In one embodiment of the present invention, the rolling bearing device of the type discussed above may be used to support a spindle of a machine tool. In this case, it is possible to increase the speed of the spindle and to reduce the temperature increase.

In one embodiment of the present invention, the inner ring may be made of a ceramic material. The ceramic material referred to above may be a sintered element containing silicon nitride as a principal component or a sintered element containing, as a principal component, β sialon which is expressed by the composition formula of $Si_{6-z}Al_zO_zN_{8-z}$, where z satisfies $0.1 \leq z \leq 3.5$.

The case in which the ceramic material is a sintered element containing silicon nitride as a principal component will be discussed.

Comparison is made between the rolling bearing device, in which both of the inner ring and the outer ring are made of steel (the steel inner ring type), and the rolling bearing device, in which the inner ring is made of silicon nitride and the outer ring is made of steel (the ceramic inner ring type). Since the steel has a linear coefficient of expansion which is about $11 \times 10^{-6}$, while the silicon nitride has a linear coefficient of expansion which is about $3.2 \times 10^{-6}$, and assuming that the temperature of the inner ring during the operation is higher than that of the outer ring, the ceramic inner ring type, as compared with the steel inner ring type, involves a radial gap (which is generally a negative gap in the machine tool) between the cylindrical rollers, which is rolling elements, and each of the inner and outer rings during the operation, which radial gap is large (the absolute value as the negative value is small). For this reason, the ceramic inner ring type is capable of relieving a preload excess phenomenon and is excellent in high speed rotating performance. The preload excess phenomenon referred to above is a phenomenon, in which the cylindrical rollers are excessively compressed in the radial direction thereof, and constitutes a major cause of hamper to the high speed rotatability of the rolling bearing unit.

Also, since the steel has a density of $7.8 \times 10^3$ kg/m$^3$ and the silicon nitride has a density of $3.2 \times 10^3$ kg/m$^3$, and considering the difference in density between those materials, the ceramic inner ring type is advantageous in respect of the preload excess brought about by a centrifugal expansion, particularly during the high speed rotation as compared with the steel inner ring type.

Yet, since the Yong's modulus of the steel is about 210 GPa and that of the silicon nitride is about 314 GPa, the ceramic inner ring type is advantageous in respect of the bearing rigidity as compared with the steel inner ring type.

While the foregoing explanation applies where the ceramic material is a sintered element containing silicon nitride as a principal component, a description similar to that described above can equally apply even where the ceramic material is a sintered element containing β sialon as a principal component. In addition, the use of the sintered element in the form of the sintered element containing β sialon as a principal component is advantageous in that it can be manufactured at a low cost as compared with the sintered element containing silicon nitride as a principal component Where the inner ring is made of the ceramic material, and where a further high speed feature is desired, the rolling elements may be also made of the ceramic material. Where the rolling elements are also made of the ceramic material, the rolling elements may be made of a ceramic material of a kind different from that used to form the inner ring.

Where the rolling elements are made of the ceramic material as well, as is the case in which the inner ring is made of the ceramic material, it is advantageous during the high speed rotation against the preload excess resulting from thermal expansion and/or centrifugal expansion and, therefore, the further high speed feature of the bearing device can be achieved. In such case, in consideration of conveniences in manufacture, the inner ring and the rolling elements can be made of ceramic materials of different kinds.

In one embodiment of the present invention, the inner ring may have a shoulder portion positioned on an axially outer side of the raceway, the shoulder portion being mounted with an inner ring spacer having an inner diametric surface fitted to an outer diametric surface of the shoulder, the inner ring spacer applying a radially acting compressive force to the shoulder portion of the inner ring. Alternatively, the inner ring may have a shoulder portion positioned on an axially outer side of the raceway, in which case the shoulder portion has an outer periphery bound by a fibrous member composed of circumferentially extending fibers to thereby apply a radially acting compressive force to the shoulder portion of the inner ring.

Where a radially acting stress is imposed on the inner ring of a generally cylindrical shape by the effect of heat and the centrifugal force, a circumferentially acting stress (hoop stress) induced in the inner ring tends to exhibit an absolute value larger than the radially and axially acting stresses from the standpoint of material dynamics. In general, since the ceramic material has a lower tensile strength than that of the steel material, there is a possibility that the inner ring may be damaged when the hoop stress acts as a tensile stress. In view of this, the radially acting compressive stress is applied from the inner ring spacer to the shoulder portion of the inner ring to counterbalance the hoop stress acting in a direction of pull. Accordingly, damage to the inner ring is avoided and a structure can be formed which is robust at a high speed rotation.

In one embodiment of the present invention, the inner ring may have a shoulder portion positioned on an axially outer side of the raceway, the shoulder portion being mounted with an inner ring spacer having an inner diametric surface fitted to an outer diametric surface of the shoulder, and wherein a shaft is fitted to an inner periphery of the inner ring and an inner periphery of the inner ring spacer, the inner ring and the shaft being engaged under interference fitting and the inner ring spacer and the shaft being engaged under clearance fitting, to thereby apply a radially acting compressive force to the shoulder portion of the inner ring.

According to this construction, with the radially acting compressive stress applied from the inner ring spacer to the shoulder portion of the inner ring, the hoop stress acting in a pulling direction can be counterbalanced to avoid damage to the inner ring, resulting in the structure robust against the high speed rotation.

In addition, where the shaft is fitted to the inner ring and the inner periphery of the inner ring spacer, the engagement therebetween during assemblage may include interference fitting between the inner ring and the shaft and clearance fitting between the inner ring spacer and the shaft (Case 1); interference fitting between the inner ring and the shaft and also between the inner ring spacer and the shaft (Case 2); and clearance fitting between the inner ring and the shaft and interference fitting between the inner ring spacer and the shaft (Case 3). Considering, however, expansion of the outer diametric surface of the shaft resulting from heat and centrifugal force, Case 1 may be employed because the function of applying the radially acting compressive force from the inner ring spacer to the shoulder portion of the inner ring is most exhibited. Also, in terms of securement of the rigidity of the inner ring raceway, Case 1 may be employed.

The fitting margin between the inner ring and the shaft during the assemblage should not be larger than required in consideration of the hoop stress acting on the inner ring. By way of example, in the case of the rolling bearing device, in which the inner diameter ranges from about 50 to 100 mm that is frequently used for the machine tool spindle, the fitting margin is to be about not greater than 5 μm even when the rigidity securement at a low speed rotation is taken into consideration. In contrast thereto, in the case of the steel inner ring of the same size, the fitting margin is required to be within the range of 20 to 30 μm in consideration of the expansion brought about by heat and the centrifugal force developed during the high speed rotation with the dmn value exceeding 2000000. As discussed above, since the ceramic inner ring can have a fitting margin that is smaller than that required with the steel inner ring, a press fitting work during assemblage can be facilitated.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1A:
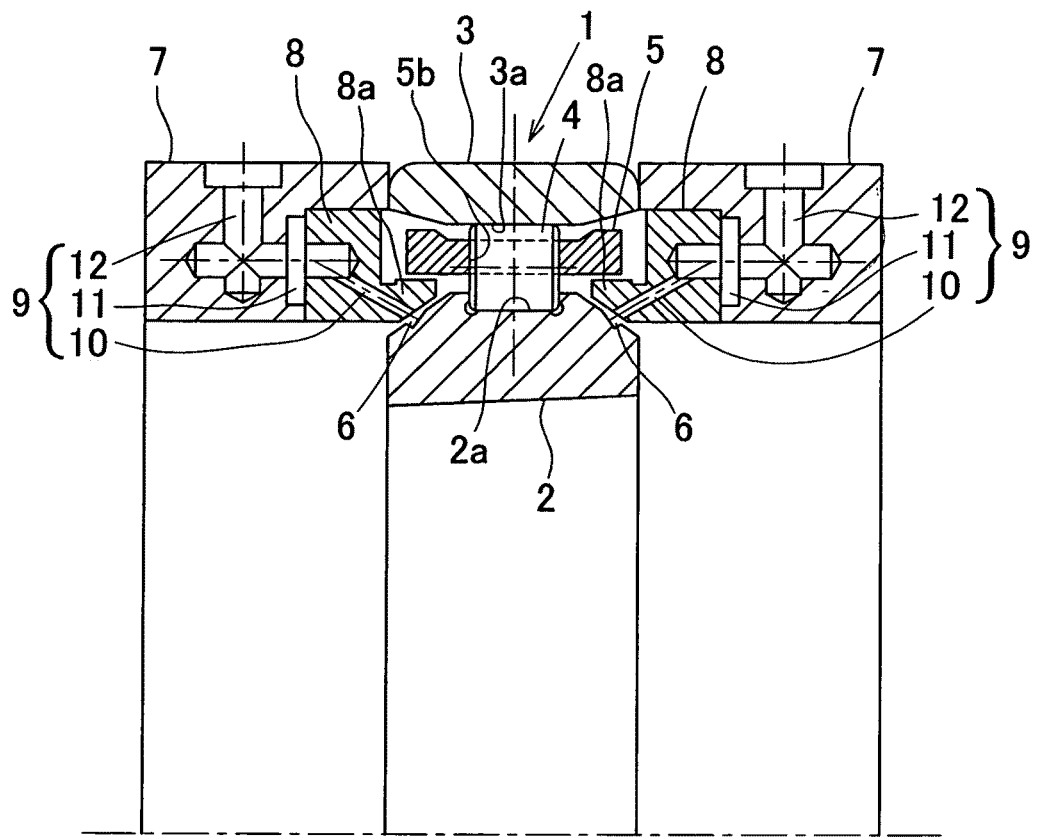
FIG. 1A is a sectional view showing a portion of a rolling bearing device according to a first embodiment of the present invention.

A first embodiment of the present invention will now be described with particular reference to FIGS. 1A and 1B. FIG. 1A illustrates in a sectional representation a rolling bearing device according to this embodiment. This rolling bearing device is of a type used as a spindle bearing in a machine tool and includes a rolling bearing unit 1 and a nozzle member 8 arranged in the vicinity of an outer ring 3 thereof. The rolling bearing unit 1 is a cylindrical roller bearing unit which includes an inner ring 2, an outer ring 3, a plurality of rolling elements, in the form of cylindrical rollers 4, which are interposed between raceways 2a and 3a defined in those inner and outer rings 2 and 3, and an annular retainer 5 for retaining the cylindrical rollers 4 in equidistantly spaced relation to each other in a direction circumferentially thereof.

The inner ring 2 is in the form of a collared inner ring having collar portions positioned on respective sides of the raceway 2a and is adapted to be fitted to an outer diametric surface of a spindle (not shown). A portion of an outer diametric surface of the inner ring 2 on each of the opposite sides of the raceway 2a with respect to the axial direction of the bearing unit is formed with an inclined surface portion 2b having a large diameter on the side of the raceway 2a. Also, each of the inclined surface portions 2b is provided with a circumferentially extending groove 6.

The outer ring 3 is fixed within a bearing housing (not shown). Outer ring positioning spacers 7 are arranged adjacent to respective sides of the outer ring 3, each having an inner diametric surface provided with a corresponding annular nozzle member 8. The outer ring positioning spacers 7 and the nozzle members 8 are made of the same bearing steel as that used to manufacture, for example, the inner and outer rings 2 and 3, or suitable ferrous material. The outer ring positioning spacers 7 are fixed within the bearing housing. Each of the nozzle members 8 is provided with an annular collar portion 8a that is inserted into a bearing space delimited between the inner ring 2 and the outer ring 3. An oil supply line 9 for supplying an air-oil, as a lubricant, to the rolling bearing unit 1 are provided over each of the left and right outer ring positioning spacers 7 and the associated nozzle members 8. The air-oil referred to above is of a kind in which a lubricant oil is mixed in a conveyance air. Each of the oil supply lines 9 is made up of a nozzle hole 10, a circumferential groove 11 and an oil supply passage 12. The nozzle member 8 is provided with a plurality of the nozzle holes 10 at respective circumferential locations in the collar portion 8a for discharging the air-oil, which is the lubricant oil, towards the circumferentially extending groove 6 in the corresponding inclined surface portion 2b of the inner ring 2. It is to be noted that the nozzle hole 10 of may be provided at only one location in the collar portion 8a of the respective nozzle member. The circumferential groove 11 is provided at a contact surface boundary between the outer ring positioning spacer 7 and the nozzle member 8 and is communicated with a plurality of the nozzle holes 10 referred to previously. The oil supply passage 12 is defined in the outer ring positioning spacer 7 so as to extend radially inwardly from an outer diametric surface of the outer ring positioning spacer 7, terminating in communication with the circumferential groove 11. With the oil supply line 9 so constructed as hereinabove described, the air-oil flowing through an air-oil supply passage (not shown), defined within the bearing housing, to the oil supply passage 12 in each of the left and right outer ring positioning spacers 7 is jetted from the nozzle holes 10 arranged over the entire circumference onto the associated inner ring inclined surface portion 2b of the rolling bearing unit 1 by way of the circumferential groove 11.

Figure 1B:
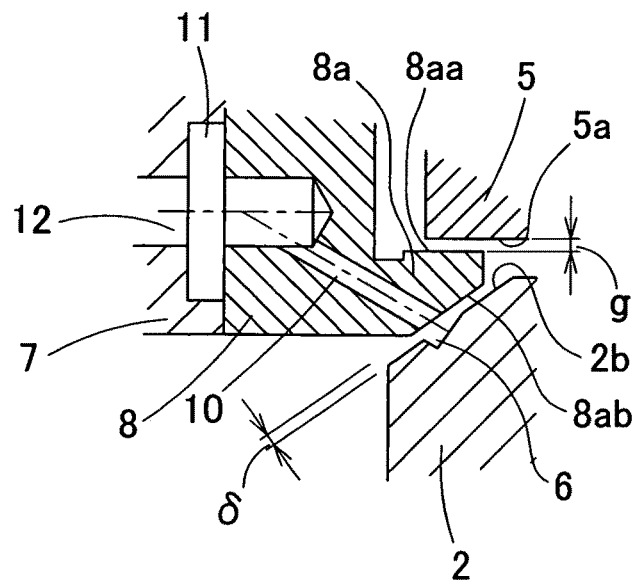
FIG. 1B is an enlarged sectional view showing that portion of the rolling bearing device shown in FIG. 1A.

As shown on an enlarged scale in FIG. 1B, an outer diametric surface 8aa of the annular collar portion 8a of the nozzle member 8 is rendered to be a retainer guide surface, and this retainer guide surface 8aa is utilized to guide an inner diametric surface 5a of the retainer 5. Also, an inner diametric surface 8ab of the annular collar portion 8a of the nozzle member 8 is formed as an inclined surface extending along the corresponding inclined surface portion 2b of the inner ring 2 so as to define a minute gap 6 in cooperation with the inclined surface portion 2b.

With the rolling bearing device so constructed as hereinabove described, the air-oil introduced from the outer diameter side of the outer ring positioning spacer 7 by way of each of the oiling passages 12 is discharged onto the circumferentially extending groove 6 in the corresponding inclined surface portion 2b of the inner ring 2 through the associated nozzle hole 10 by way of the circumferential groove 11. The lubricant oil received in each of the circumferentially extending grooves 6 of the inner ring 2 is guided into the bearing unit 1 along the inclined surface portion 2b of the inner ring 2 by the effect of a centrifugal force, developed as a result of rotation of the inner ring 2, and the surface tension and is, after having been scattered towards the outer diametric side mainly at an upper end of the respective inclined surface portion 2b, utilized to lubricate between pockets 5b of the retainer 5 and the cylindrical rollers 4, or to lubricate between rolling surfaces of the cylindrical rollers 4 and the raceways 2a and 3a of the inner and outer rings 2 and 3. Simultaneously therewith, part of the air supplied under pressure into the bearing unit moves from the side of the cylindrical rollers 4 towards the side of the nozzle member 8 in a guide gap g defined cooperatively by the retainer guide surface 8aa, which is the outer diametric surface of the nozzle member collar portion 8a, and the inner diametric surface 5a of the retainer 5, for lubricating the guide gap g.

The inner diametric surface 8ab of the nozzle member collar portion 8a is formed as an inclined surface extending along the inner ring inclined surface portion 2b so as to define, cooperatively with the inner ring inclined surface portion 2b, the gap 6 therebetween. Within this gap 6, the oil stuck to the inner ring inclined surface portion 2b by the effect of the surface tension is, by an inclined surface oriented component of the centrifugal force, further smoothly introduced into the bearing unit along the inner ring inclined surface portion 2b. Also, since the air-oil is not directly jetted into the bearing unit from each of the nozzle holes 10, no wind noise occurs, the silencing property is excellent and the flow of air is minimized.

Also, since the outer diametric surface 8aa of the collar portion 8a of each of the nozzle member 8 is rendered to be the retainer guide surface operable to guide the inner diametric surface 5a of the retainer 5, it is possible to avoid such problems as experienced with the retainer of the rolling element guide system hereinbefore discussed, i.e., increase of the fluctuation of the retainer 5 and/or damages to the pockets 5b of the retainer 5 as a result of interference with the cylindrical roller 4, which are rolling elements.

Moreover, the guide gap g referred to above forms a so-called right round, short width journal dynamic pressure bearing having a small width relative to the diameter to thereby stably support the retainer 5 on a non-contact basis due to the load bearing capacity and the damping property brought about by the presence of the oil film.

In addition, when comparing with the outer ring guide system employed in the previously described conventional example (disclosed in the Patent Document 1 referred to above), this retainer guide system results in reduction in radius and sliding speed of the retainer guide surface 8aa that guides the inner diametric surface 5a of the retainer 5. Since the inner ring of the bearing unit employed in the machine tool spindle device is, when in use, rotating at a high speed generally at a few thousands to a few ten thousands of $min^{-1}$ and the retainer as well is rotating at a speed which is about 40% thereof, the sufficient sliding speed required for the generation of dynamic pressure can be available. In view of this, although a practical problem is to reduce the viscous resistance torque loss in the guide gap g, this retainer guide system is effective to reduce the torque loss since the torque loss power is proportional to the product of the square of the retainer rotating speed multiplied by the cube of the radius of the retainer guide surface 8aa.

Yet with this retainer guide system, since a fresh, low temperature lubricant oil such as described hereinbefore is supplied at all times to the guide gap g to cool the guide gap g, an undesirable increase of the temperature of the bearing system can be suppressed and, in terms of a preload control, this retainer guide system is advantageous as compared with the outer ring guide system.

Further, with this retainer guide system, change of the guide gap g resulting from the high speed rotation tends to become considerable and a direct contact between the retainer guide surface 8aa and the inner diametric surface 5a of the retainer 5 during the operation can be assuredly avoided.

In other words, with this retainer guide system, the guide gap g increases during the high speed rotation by the action of the centrifugal force acting on the retainer 5. At the same time, when considering the thermal expansion, not only the inner diametric surface 5a of the retainer 5, but also the diameter of the retainer guide surface 8aa increases, but considering the difference in linear coefficient of expansion since it is quite frequent that the nozzle member 8 is made of a ferrous material and the retainer 5 is made of a resinous material or a copper-based material, the guide gap g tends to increase after all. In contrast thereto, with the outer ring guide system employed in the related art (such as disclosed in the Patent Document 1 referred to above), the guide gap tends to reduce during the high speed rotation. Accordingly, with this retainer guide system, the direct contact between the retainer guide surface 8aa and the retainer inner diametric surface 5a during the high speed rotation can be avoided assuredly.

It is to be noted that although in describing the first embodiment of the present invention, reference has been made to the air-oil lubrication, in which the air-oil is discharged from the nozzle holes 10, the lubricating system may not be necessarily limited thereto and effects similar to those brought about by the lubricating system discussed hereinbefore can be equally obtained even when a jet lubricating system, in which a lubricant oil concurrently used to cool and to lubricate is jetted from the nozzle holes 10.

Figure 2A:
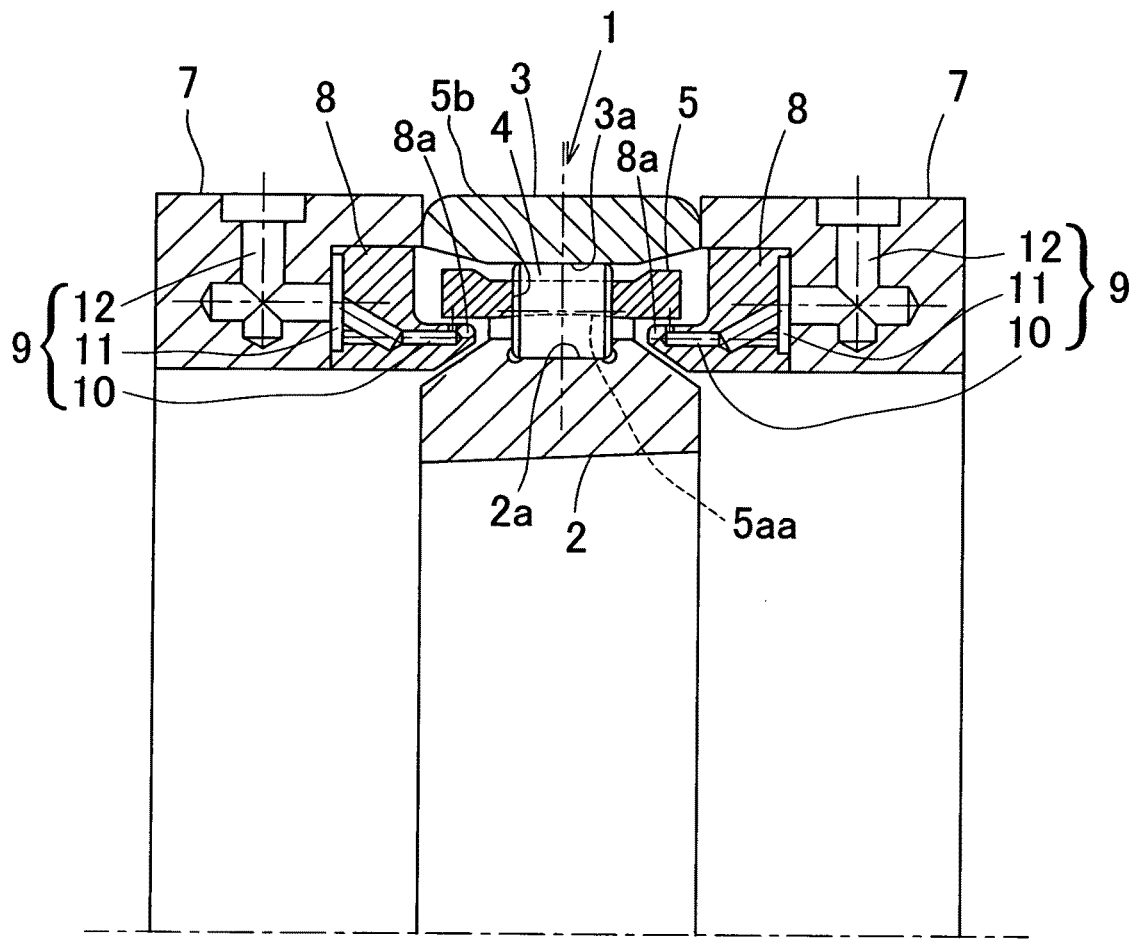
FIG. 2A is a sectional view showing a portion of a rolling bearing device according to a second embodiment of the present invention.
Figure 2B:
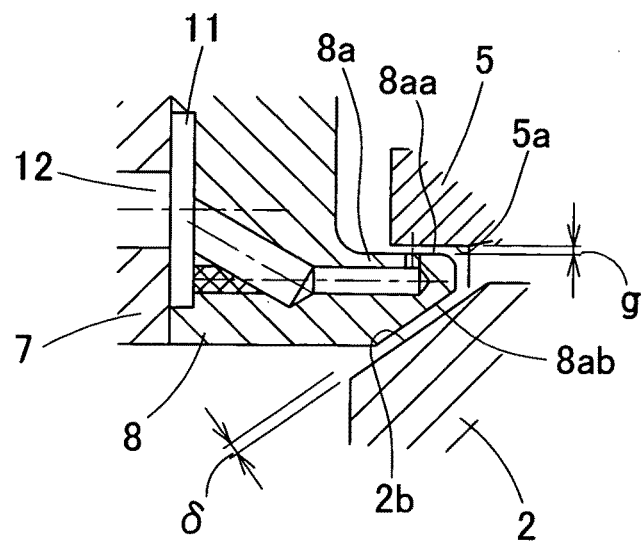
FIG. 2B is an enlarged sectional view showing a portion of the rolling bearing device shown in FIG. 2A.

FIGS. 2A and 2B illustrate a second embodiment of the present invention. This second embodiment is similar to the first embodiment shown in and described with reference to FIGS. 1A and 1B, but differs therefrom in that each of the nozzle holes 10 in the nozzle member collar portions 8a is made open at the retainer guide surface 8aa, which is an outer diametric surface of the respective collar portion 8a, so that the air-oil, which is the lubricating agent, can be discharged from the respective nozzle holes 10 towards the inner diametric surface 5a of the retainer 5 to thereby lubricate the guide gap g. Even in this case, although the mere provision of the nozzle hole 10 at only one circumferential location on the corresponding nozzle member collar portion 8a is effective to allow the function of guiding the retainer 5 and the lubricating function to be exhibited, the provision thereof at a plurality of circumferential locations spaced equidistantly from each other is effective to guide the retainer 5 in a more balanced fashion.

Also, a center portion 5*aa* of the inner diametric surface 5*a* of the retainer 5 is formed as an inclined surface having a larger diameter on a center side. Accordingly, the lubricant oil deposited on the inner diametric surface 5*a* of the retainer 5 is guided towards the pockets 5*b* of the retainer 5 along the inclined surface at the center portion 5*aa* by the effect of the centrifugal force, so that the lubricant oil can be supplied to between the retainer pockets 5*b* and the cylindrical rollers 4 and also between the rolling surfaces of the cylindrical rollers 4 and the raceways 2*a* and 3*a* of the inner and outer rings 2, 3 for lubrication thereof.

The provisions of the inclined surface portion 2*b*, which is large in diameter at a location adjacent the raceway 2*a*, in the outer diametric surface on both sides of the raceway 2*a* of the inner ring 2 with respect to the axial direction thereof is similar to that shown and described in connection with the first embodiment with particular reference to FIGS. 1A and 1B, but no circumferentially groove 6 is employed in such inclined surface portion 2*b*. In addition, the structure in which the inner diametric surface 8*ab* of each of the collar portions 8*a* of the nozzle members is formed as an inclined surface extending along the corresponding inclined surface portion 2*b* of the inner ring 2 so that the minute gap 6 can be formed between it and the inclined surface portion 2*b* is similar to that shown and described in connection with the first embodiment with particular reference to FIGS. 1A and 1B. Accordingly, the lubricant oil tending to flow outwardly of the bearing unit through the minute gap 6 can be returned back to the inside of the bearing unit for lubrication by the effect of the centrifugal force and the surface tension developed on the inner ring inclined surface portion 2*b* and the inner diametric inclined surface 8*ab* of the nozzle member collar portion 8*a*.

Figure 3A:
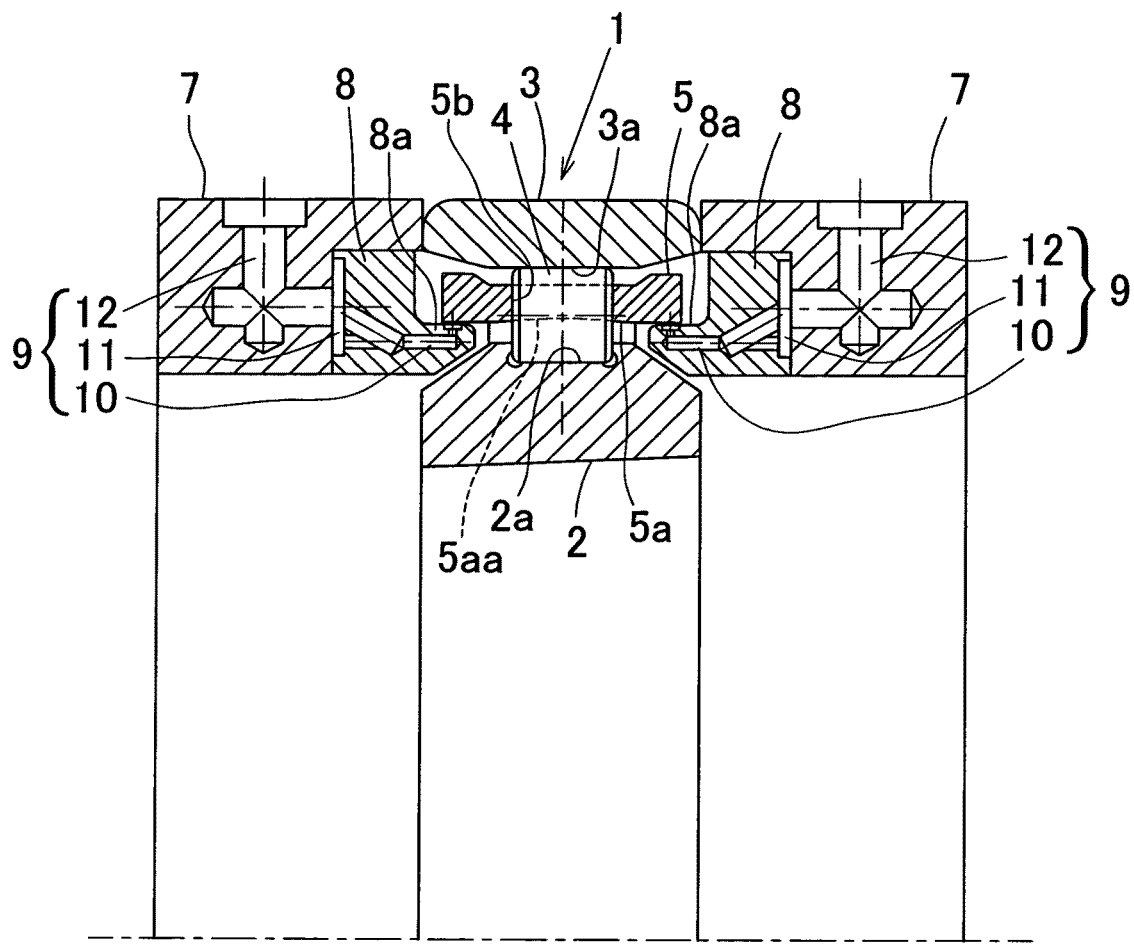
FIG. 3A is a sectional view showing a portion of a rolling bearing device according to a third embodiment of the present invention.
Figure 3B:
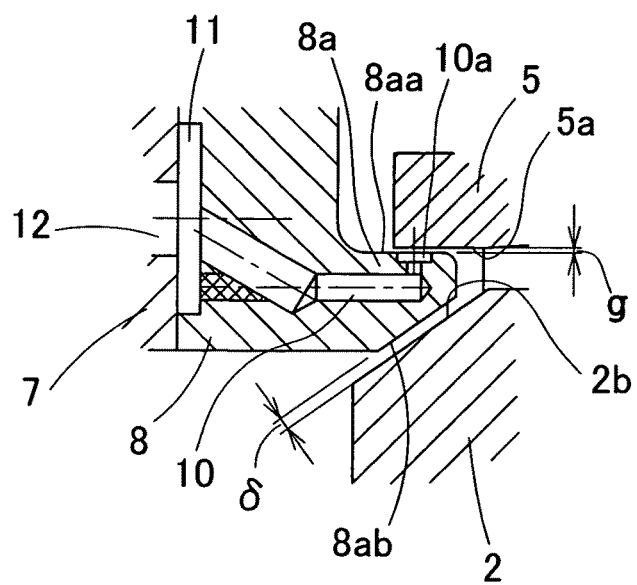
FIG. 3B is an enlarged sectional view showing a portion of the rolling bearing device shown in FIG. 3A.

FIGS. 3A and 3B illustrate a third embodiment of the present invention. This third embodiment is similar to the second embodiment shown in and described hereinabove with reference to FIGS. 2A and 2B, but differs therefrom in that a pocketed orifice restrictor portion 10*a* as best shown in FIG. 3B on an enlarged scale is provided at an exit portion of the nozzle hole 10 defined in each of the nozzle member collar portions 8*a* to construct the guide gap g as a static pressure bearing unit of a constant pressure type, but not as a dynamic pressure bearing unit. It is to be noted that for the restrictor portion 10, any other suitable type such as, for example, a capillary tube restrictor or an inherent restrictor may be employed. In such case, if three to eight nozzle holes 10 are provided at respective locations in the circumferential direction of the nozzle member collar portion 8*a*, the retainer 5 can be stably guided by the effect of a static pressure bearing effect even when the rotating speed of the bearing device is low. Other structural features and effects brought about thereby are similar to those afforded by the second embodiment shown and described with particular reference to FIGS. 2A and 2B.

Figure 4:
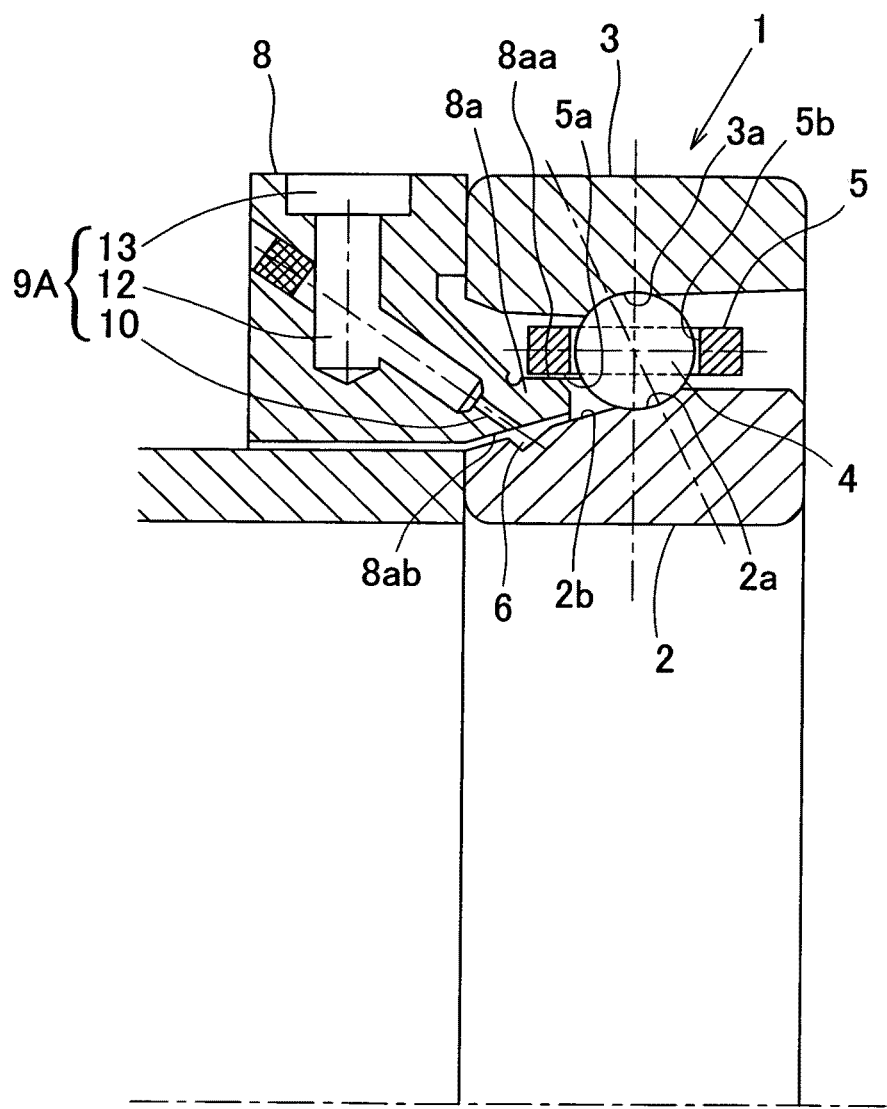
FIG. 4 is a sectional view showing a portion of a rolling bearing device according to a fourth embodiment of the present invention.

FIG. 4 illustrates a fourth embodiment of the present invention. This fourth embodiment is similar to the previously described first embodiment shown in FIGS. 1A and 1B, but differs therefrom in that this embodiment is directed to an angular contact ball bearing device in place of the cylindrical roller bearing device. In such case, the nozzle member 8 is fixed within the bearing housing. In other words, the nozzle member 8 in this case is of a version, in which the outer ring positioning spacer 7 and the nozzle member 8, both employed in the practice of the first embodiment shown in and described with reference to FIGS. 1A and 1B, are integrated together, with the nozzle hole 10, the oil supply passage 12 and a circumferential groove 13, forming respective parts of an oil supply line 9A, being provided in this nozzle member 8. The circumferential groove 13 referred to above is provided in the outer diametric surface of the nozzle member 8 and the nozzle holes 10 and the oil supply passages 12 are provided at a plurality of circumferential locations spaced equidistantly from each other in a direction circumferentially thereof. Accordingly, the air-oil introduced from an air-oil supply passage (not shown) within the bearing housing to the circumferential groove 13 is supplied to the nozzle hole 10 through the various oiling passages 12. In such case, the nozzle member 8 is disposed on the rear side of the angular contact ball bearing unit 1 and not on the front side thereof. Other structural features and effects brought about thereby are similar to those afforded by the first embodiment shown in and described with reference to FIGS. 1A and 1B.

Figure 5:
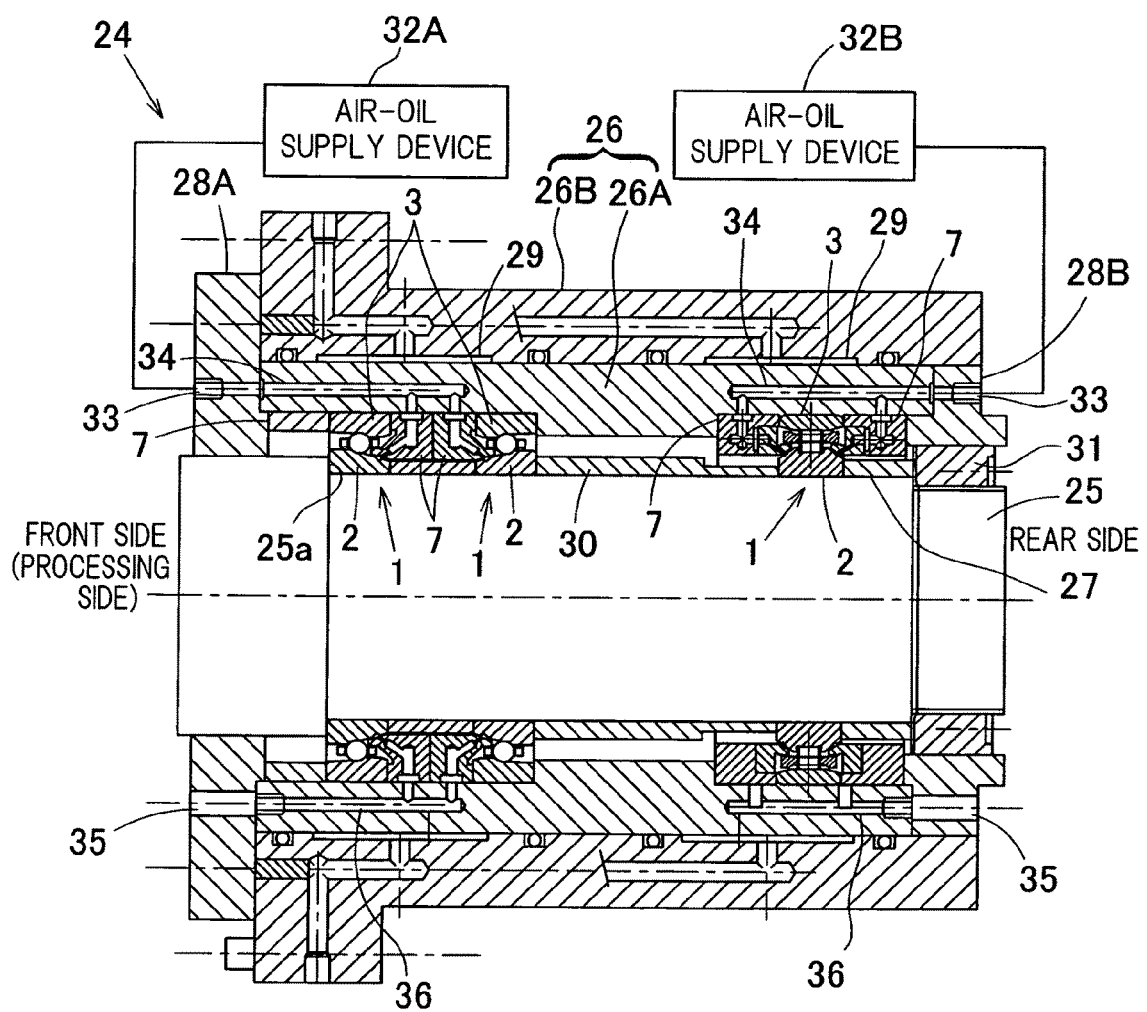
FIG. 5 is a structural diagram showing a spindle device equipped with the rolling bearing device shown in FIGS. 1A to 4.

FIG. 5 illustrates an example of a high speed spindle device equipped with the rolling bearing devices according to the first and fourth embodiments shown in and described with reference to FIGS. 1A and 1B, and FIG. 4, respectively. This spindle device now indicated by 24 is of a type applied in a machine tool and includes a spindle 25 having a front side (processing side) end thereof to which a chuck for a tool or a work is fitted. The spindle 25 has an axial front side supported by a set of double rows of angular ball contact bearing type rolling bearing devices (FIG. 4) and an axial rear side supported by a cylindrical roller bearing type rolling bearing device (FIGS. 1A and 1B). The inner ring 2 of each of the rolling bearing units 1 is fitted on an outer diametric surface of the spindle 25, while the outer ring 3 is fitted on the inner diametric surface of the bearing housing 26. With respect to the rolling bearing unit 1 on the front side of the spindle, the inner ring 2 thereof and the outer ring 3 thereof are fixed inside the bearing housing 26 by means of a stepped face 26*a* in the spindle 25 and by means of a presser lid 28A through the outer ring positioning spacer 7, respectively. With respect to the rolling bearing unit on the rear side of the spindle, the inner ring 2 thereof and the outer ring 3 thereof are fixed inside the bearing housing 26 by means of an inner ring positioning spacer 27 and by means of a presser lid 28B through the outer ring positioning spacer 7, respectively. The bearing housing 26 is of a double boxed structure including an inner peripheral bearing housing 26A and an outer peripheral bearing housing 26B, with a cooling groove 29 defined between the inner and outer peripheral bearing housings 26A and 26B. The outer ring positioning spacer 7 is arranged on the side of the other end face of the outer ring of each of the rolling bearing units 1, and the inner peripheral bearing housing 26A intervenes between those outer ring positioning spacers 7 and 7. The spindle 25 has a rear end portion on which a bearing fixing nut 31 for fixing the rolling bearing unit 1 while being pressed thereagainst is threadingly mounted.

Each of the presser lids 28A and 28B is provided with an air-oil introducing hole 33 for introducing the air-oil from a corresponding air-oil supply device 32A and 32B, which is a supply source for the air-oil in the case where the rolling bearing units 1 are lubricated with the air-oil. This air-oil introducing hole 33 in each of the presser lids 28A and 28B is communicated with an associated air-oil supply passage 34 defined in the inner peripheral bearing housing 26A. Also, each of the presser lids 28A and 28B is provided with an oil discharge hole 35 defined therein in communication with a corresponding oil discharge passage 36 defined in the inner peripheral bearing housing 26A.

In the spindle device 24 so structured and so configured as hereinabove described, since the previously described rolling bearing device is incorporated therein, the high speed operation of the spindle 25 and reduction in increase of the temperature can be accomplished.

Although each of the foregoing embodiments of the present invention is such that any of the inner and outer rings 2 and 3 is made of a bearing steel, the rolling bearing device employing the inner ring made of a ceramic material will be hereinafter described in detail.

The rolling bearing device shown in FIG. 6 in connection with a fifth embodiment of the present invention is similar to the rolling bearing device according to the first embodiment shown in and described with reference to FIGS. 1A and 1B, but differs therefrom in that in place of the inner ring 2 employed in the rolling bearing device according to the first embodiment, an inner ring and spacer combination 14A made up of a combination of an inner ring 2A and two inner ring spacers 13A arranged on respective sides of the inner ring 2A is employed. The inner ring 2A is made of a ceramic materials such as a sintered element containing silicon nitride as a principal component or a sintered element containing, as a principal component, β sialon which is expressed by the composition formula of $Si_{6-z}Al_zO_zN_{8-z}$ where z satisfies $0.1 \leq z \leq 3.5$. Each of the inner ring spacers 13A is made of a bearing steel or any other suitable ferrous material.

The inner ring 2A is of a collarless shape and has shoulder portions 2c positioned radially inwardly of the raceway 2a and on an axially outer sides of opposite ends of the raceway 2a. In this embodiment, each of the shoulder portions 2c has an outer diametric surface rendered to be a surface parallel in the axial direction.

Each of the inner ring spacers 13A has a collar portion 13a at a location adjacent end faces of the cylindrical rollers 4, with an inner diametric surface of each collar portion 13a held in contact with an outer diametric surface of the adjacent shoulder portion 2c of the inner ring 2A and an end face 13c of each collar portion 13A on an axially inner side held in contact with an end face of the inner ring 2A. It is so assembled such that the collar portion 13a of each of the inner ring spacers 13A may apply a radially acting compressive force to the adjacent shoulder portion 2c of the inner ring 2A. Also, the inner ring spacers 13A are positioned with the end faces 13c of the inner ring spacers 13A held in contact with the opposite end faces of the inner ring 2A. An outer diametric surface of each of the inner ring spacers 13A is formed with an inclined surface portion 13b having a large diameter on the side of the inner ring 2A. The circumferentially extending groove 6 referred to previously for receiving the lubricant discharged from the nozzle hole 10 is provided in this inclined surface portion 13b. The inner ring positioning spacer 27 referred to previously is provided on an axially outer side of the inner ring spacer 13A.

A shaft 15 is fitted on an inner periphery of the inner ring and spacer combination 14A. Fitting between the inner ring 2A and the shaft 15 is accomplished by means of interference fitting while fitting between the inner ring spacer 13A and the shaft is accomplished by means of clearance fitting. The reason therefor will be discussed hereinafter.

Figure 6:
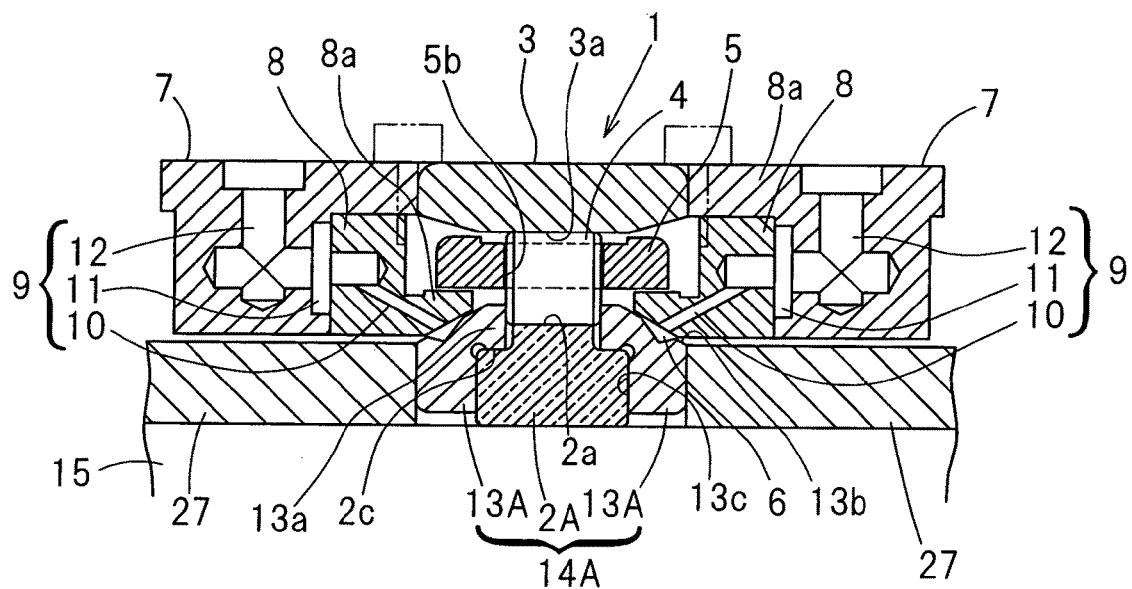
FIG. 6 is a sectional view showing a portion of a rolling bearing device according to a fifth embodiment of the present invention.
Figure 7:
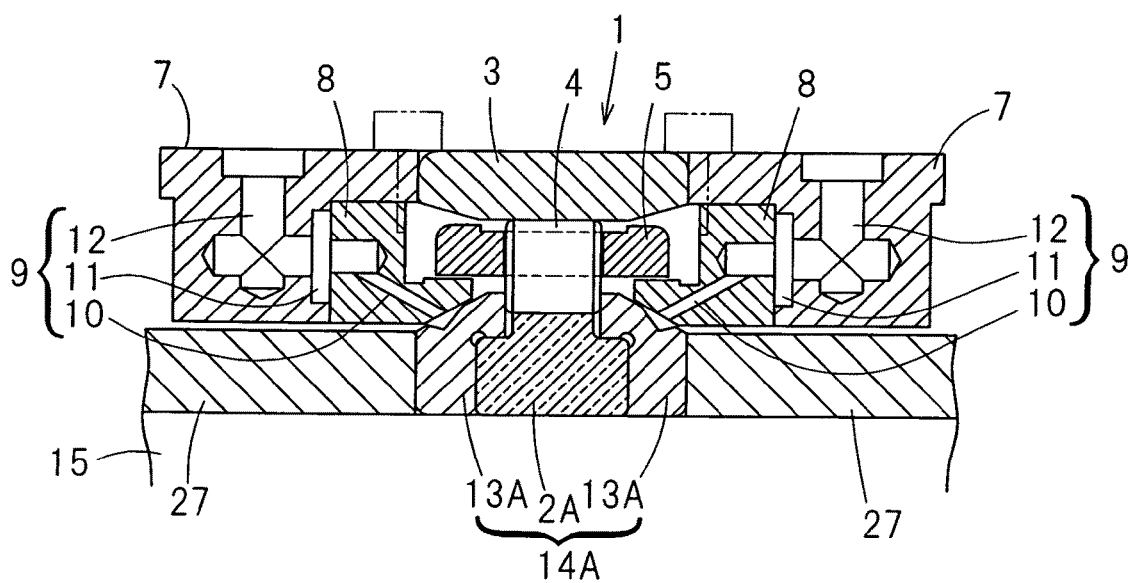
FIG. 7 is a sectional view showing a portion of a rolling bearing device according to a sixth embodiment of the present invention.
Figure 8:
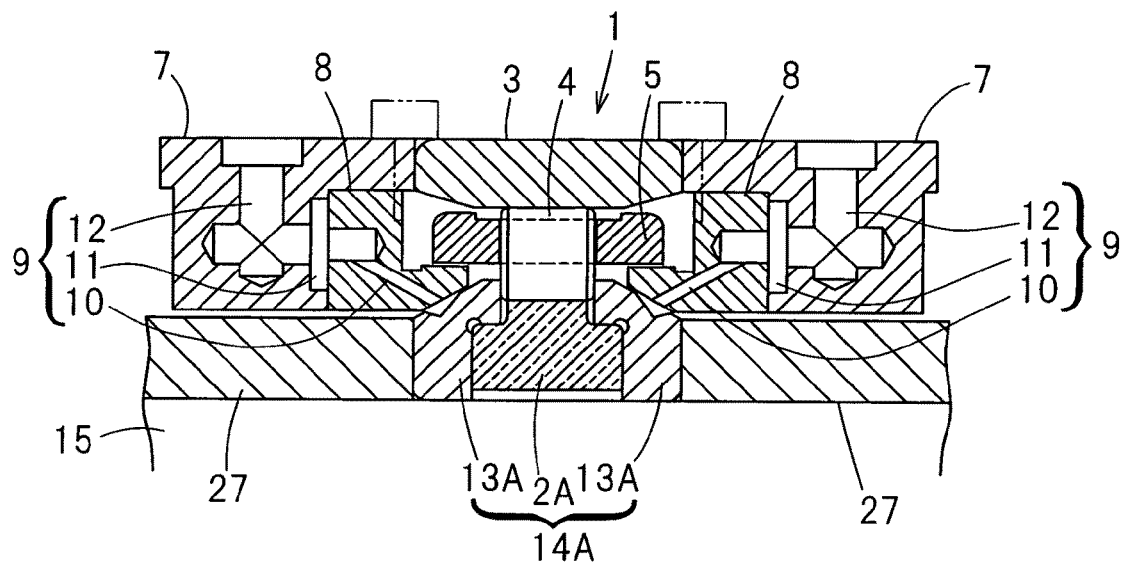
FIG. 8 is a sectional view showing a portion of a rolling bearing device according to a seventh embodiment of the present invention.

As for the fitting during the assemblage, three cases can be contemplated, including interference fitting between the inner ring 2A and the shaft 15 in combination with clearance fitting between the inner spacer 13A and the shaft 15 (FIG. 6), interference fitting between the inner ring 2A and the shaft 15 and also between the inner spacer 13A and the shaft 15 (FIG. 7 showing a sixth embodiment), and clearance fitting between the inner ring 2A and the shaft 15 in combination with interference fitting between the inner ring spacer 13A and the shaft 15 (FIG. 8 showing a seventh embodiment). Considering the expansion of the outer diametric surface of the shaft 15 brought about by heat and the centrifugal force, the structure shown in FIG. 6 appears feasible since the function of applying the radially acting compressive force to the shoulder portion 2c of the inner ring 2A through the above described inner ring spacer 13A can be most effectively exhibited. Also, in terms of securement of the rigidity of the inner ring raceway 2a, the structure shown in FIG. 6 may be employed.

Other structural features are similar to those of the rolling bearing device shown in and described with reference to FIGS. 1A and 1B in connection with the first embodiment. Component parts similar to those shown and described are indicated by like reference numerals and, therefore, the details thereof are not iterated for the sake of brevity. Even this rolling bearing device can give rise to effects similar to those afforded by the rolling bearing device shown in and described with reference to FIGS. 1A and 1B in connection with the first embodiment, as the air-oil can be discharged from the nozzle hole 10 towards the circumferentially extending groove 6 defined in the inclined surface portion 13b of the inner ring spacer 13A.

In addition, this rolling bearing device can bring about the following effects since the inner ring 2A is made of a ceramic material. Explanation will be given in connection with the example in which the ceramic material contains silicon nitride as a principal component.

Comparison is made between the rolling bearing device, in which both of the inner ring 2A and the outer ring 3 are made of steel (the steel inner ring type), and the rolling bearing device, in which the inner ring 2A is made of silicon nitride and the outer ring 3 is made of steel (the ceramic inner ring type). Since the steel has a linear coefficient of expansion which is about $11 \times 10^{-6}$, while the silicon nitride has a linear coefficient of expansion which is about $3.2 \times 10^{-6}$, and assuming that the temperature of the inner ring 2A during the operation is higher than that of the outer ring 3, the ceramic inner ring type, as compared with the steel inner ring type, involves a larger radial gap (which is generally a negative gap in the machine tool) between the cylindrical rollers 4, which is rolling elements, and each of the inner and outer rings 2A and 3 during the operation (the absolute value as the negative value is smaller). For this reason, the ceramic inner ring type is capable of relieving a preload excess phenomenon and is excellent in high speed rotating performance. The preload excess phenomenon referred to above is a phenomenon, in which the cylindrical rollers 4 are excessively compressed in the radial direction thereof, and constitutes a major cause of hamper to the high speed rotatability of the rolling bearing unit 1.

Also, since the steel has a density of $7.8 \times 10^3$ kg/m$^3$ while the silicon nitride has a density of $3.2 \times 10^3$ kg/m$^3$, and considering the difference in density between those materials, the ceramic inner ring type is advantageous in respect of the preload excess brought about by a centrifugal expansion, particularly during the high speed rotation as compared with the steel inner ring type.

Yet, since the Yong's modulus of the steel is about 210 GPa and that of the silicon nitride is about 314 GPa, the ceramic inner ring type is advantageous in respect of the bearing rigidity as compared with the steel inner ring type.

While the foregoing explanation applies where the ceramic material is a sintered element containing silicon nitride as a principal component, a description similar to that described above can equally apply even where the ceramic material is a sintered element containing 13 sialon as a principal component.

In addition, since the sintered element containing 13 sialon as a principal component is sintered under a low pressure, for example, a pressure lower than 1 MPa, it has a merit in that it can be manufactured at a low cost as compared with the sintered element containing silicon nitride as a principal component, which is sintered under a pressure higher than 10 MPa.

It is to be noted that regarding the 13 sialon, the details thereof are set forth later.

Where a radially acting stress is imposed on the inner ring 2A of a generally cylindrical shape by the effect of heat and the centrifugal force, a circumferentially acting stress (hoop stress) induced in the inner ring 2A tends to exhibit an absolute value larger than the radially and axially acting stresses from the standpoint of material dynamics. In general, since the ceramic material has a lower tensile strength than that of the steel material, it is possible that the inner ring 2A may be damaged when the hoop stress acts as a tensile stress. In view of this, the radially acting compressive stress is applied from the inner ring spacer 13A to the shoulder portion 2c of the inner ring 2A to counterbalance the hoop stress acting in a direction of pull. Accordingly, damage to the inner ring 2A is avoided and it can cope with the high speed rotation sufficiently.

In order for the function of applying the radially acting compressive stress to the shoulder portion 2c of the inner ring 2A through the above described inner ring spacer 13A to be most effectively exhibited, as shown in FIG. 6, the inner ring 2A and the shaft 15 may be engaged with each other under interference fitting and the inner ring spacer 13A and the shaft 15 may be engaged with each other under clearance fitting. Depending on the case, the inner ring 2A and the shaft 15 as well as the inner ring spacer 13A and the shaft 15 may be engaged with each other under interference fitting as shown in FIG. 7.

In the case of either FIG. 6 or FIG. 7, the fitting margin between the inner ring 2A and the shaft 15 during the assemblage should not be larger than required in consideration of the hoop stress acting on the inner ring 2A. By way of example, in the case of the rolling bearing device, in which the inner diameter ranges from about 50 to 100 mm that is mostly used for the machine tool spindle, the fitting margin is to be about not greater than 5 μm in consideration of the rigidity securement at a low speed rotation as well. In contrast thereto, in the case of the steel inner ring of the same size, the fitting margin is required to be within the range of 20 to 30 μm in consideration of the expansion brought about by heat and the centrifugal force developed during the high speed rotation with the dmn value exceeding 2000000. As discussed above, since the ceramic inner ring can have a fitting margin that is smaller than that required with the steel inner ring, a press fitting work during assemblage can be facilitated.

Figure 9:
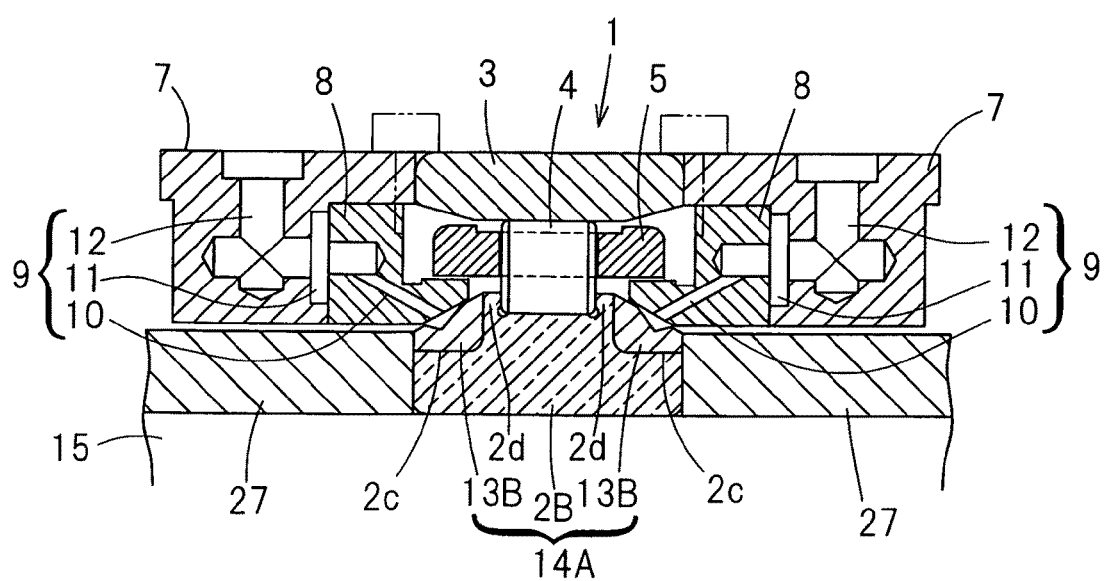
FIG. 9 is a sectional view showing a portion of a rolling bearing device according to an eighth embodiment of the present invention.

FIG. 9 illustrates an eighth embodiment. Although even this rolling bearing device makes use of the inner ring and spacer combination 14B made up of a inner ring 2B and two inner ring spacers 13B, the inner ring 2B has a collar portion 2d engaged with end faces of the cylindrical rollers 4 with the inner ring spacer 13B arranged on an outer side of the collar portion 2d. The inner ring spacer 13B is so assembled as to apply a radially acting compressive force to the shoulder portion 2c of the inner ring 2B. The inner ring 2B has its inner periphery fitted with the shaft 15 under interference fitting and an inner ring positioning spacer 27 is provided in contact with the end face of the inner ring 2B. As is the case with that described hereinbefore, the inner ring 2B is made of a ceramic material such as a sintered element containing silicon nitride as a principal component, or a sintered element containing μsialon as a principal component expressed by the composition formula of $Si_{6-z}Al_zO_zN_{8-z}$ where z satisfies $0.1 \leq z \leq 3.5$, and the inner ring spacer 13B is made of a bearing steel or any other suitable ferrous material.

Figure 10:
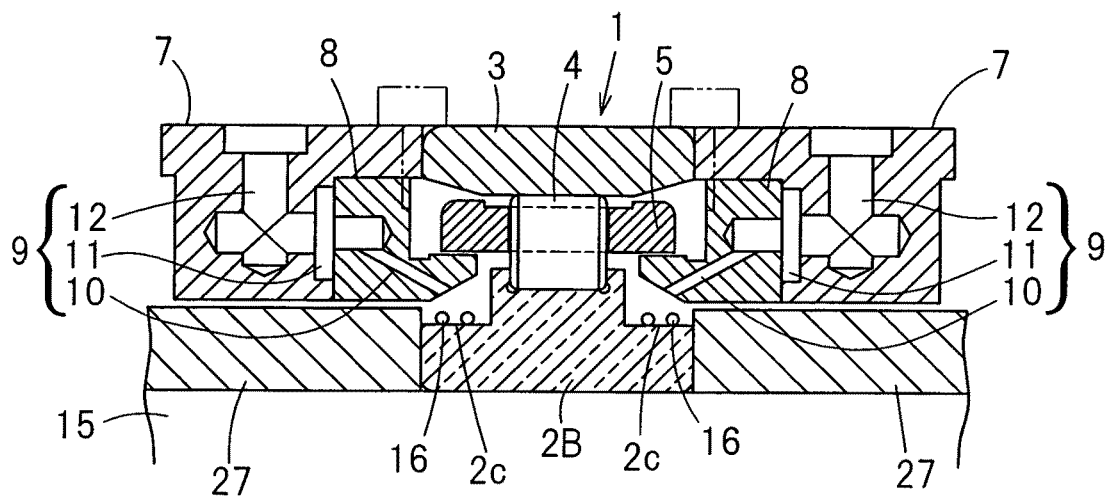
FIG. 10 is a sectional view showing a portion of a rolling bearing device according to a ninth embodiment of the present invention.

This rolling bearing device brings about effects similar to those afforded by the rolling bearing device shown in and described with reference to FIG. 6. In addition, since the collar portion 2d as well is made of the ceramic material, the lubricity between the collar portion 2d and the end surface of the cylindrical rollers 4 is better than that exhibited in the rolling bearing device shown in and described with reference to FIG. 6 whereby the collar portion 2d may have an excellent anti-seizing property.

Where the inner ring 2B is of a shape having the collar portion 2d, the radially acting compressive force may be applied to the shoulder portion 2c of the inner ring 2B when, as shown in FIG. 10 showing a ninth embodiment of the present invention, an outer periphery of the shoulder portion 2c is bound by a fibrous member 16 made up of fibers extending in a direction circumferentially thereof. For example, the fibrous member 16 is wound 360° around the shoulder portion 2c of the inner ring 2B. For the fibrous member 16, alamid fibers or carbon fibers excellent in tensile strength may be employed suitably. In particular, the use of the alamid fibers having a negative linear coefficient of expansion ($-4 \times 10^{-6}$) is effective. In such case, it is recommended to use a member, in which an inclined surface portion having a large diameter on the side of the inner ring 2B is provided in an outer diametric surface thereof and a circumferentially extending groove is defined in that inclined surface portion, in place of the inner ring spacer 13B.

Figure 11:
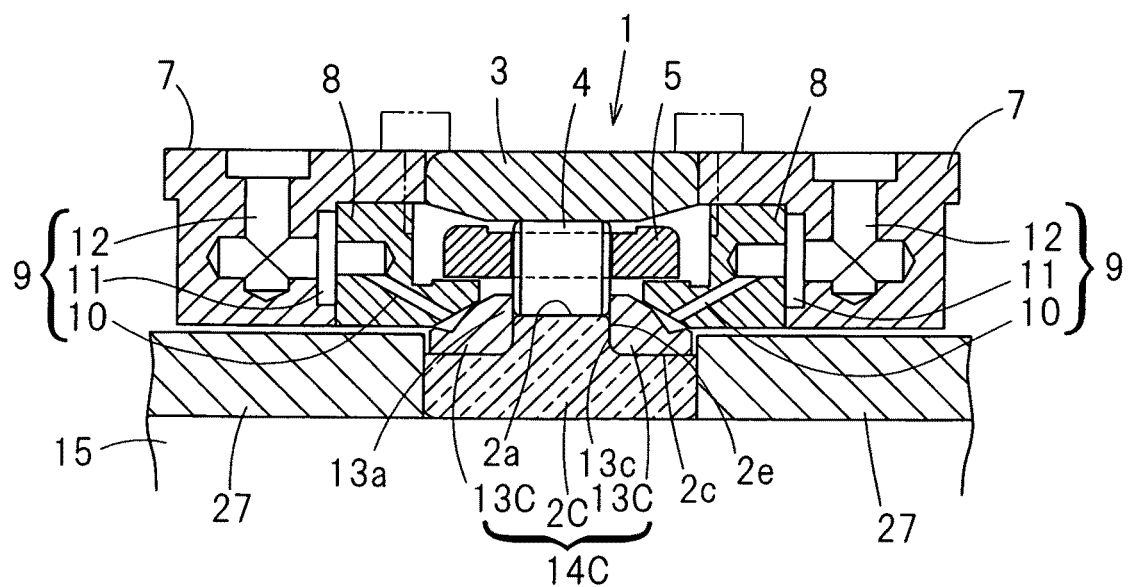
FIG. 11 is a sectional view showing a portion of a rolling bearing device according to a tenth embodiment of the present invention.

As shown in FIG. 11 showing a tenth embodiment of the present invention, in the rolling bearing device, in which an inner ring 2C having no collar portion and an inner ring spacer 13C having a collar portion 13a are combined to together to provide an inner ring and spacer combination 14C, the shoulder portion 2c of the inner ring 2C may be extended axially outwardly a distance greater than that that shown in and described with reference to FIG. 6, so that an end face of the inner ring positioning spacer 27 may contact an end face of the inner ring 2C. In such case, when the end face 13c of the inner ring spacer 13C is brought into contact with a stepped face 2e of the inner ring 2C, the inner ring spacer 13C is positioned. If so constructed as described above, as compared with that shown in and described with reference to FIG. 6, since the surface of contact between an inner periphery of the inner ring 2C and the shaft 15 is large, a further increased rigidity of the raceway 2a can be given.

Figure 12:
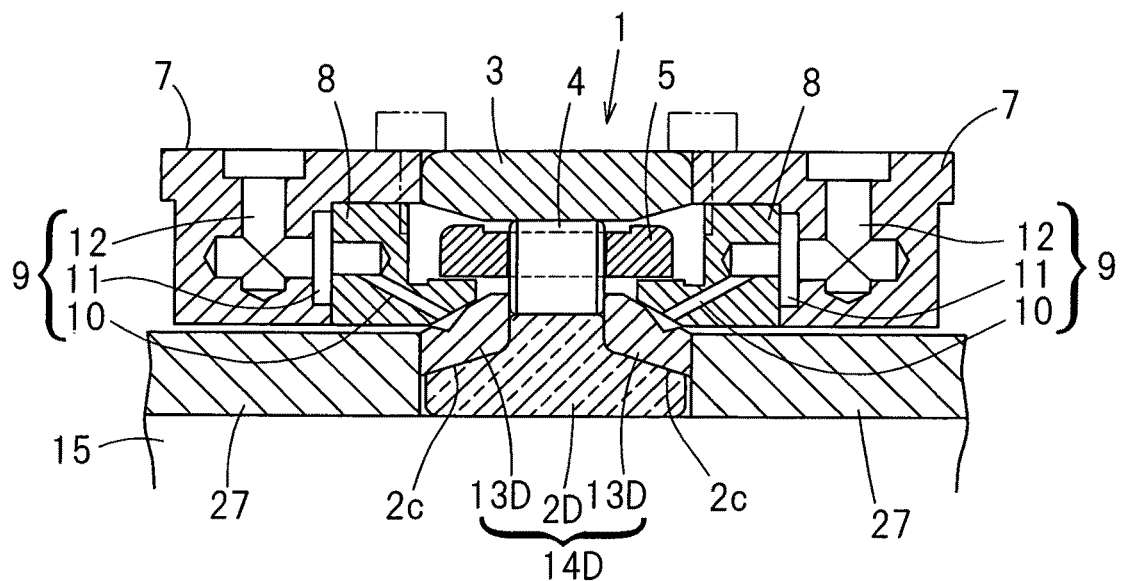
FIG. 12 is a sectional view showing a portion of a rolling bearing device according to an eleventh embodiment of the present invention.

Also, as shown in FIG. 12 showing an eleventh embodiment of the present invention, in order to increase the assemblability of an inner ring 2D and an inner ring spacer 13D, the shoulder portion 2c of the inner ring 2D may be of such a tapered shape that the diameter thereof progressively decrease towards the outside thereof.

Figure 13:
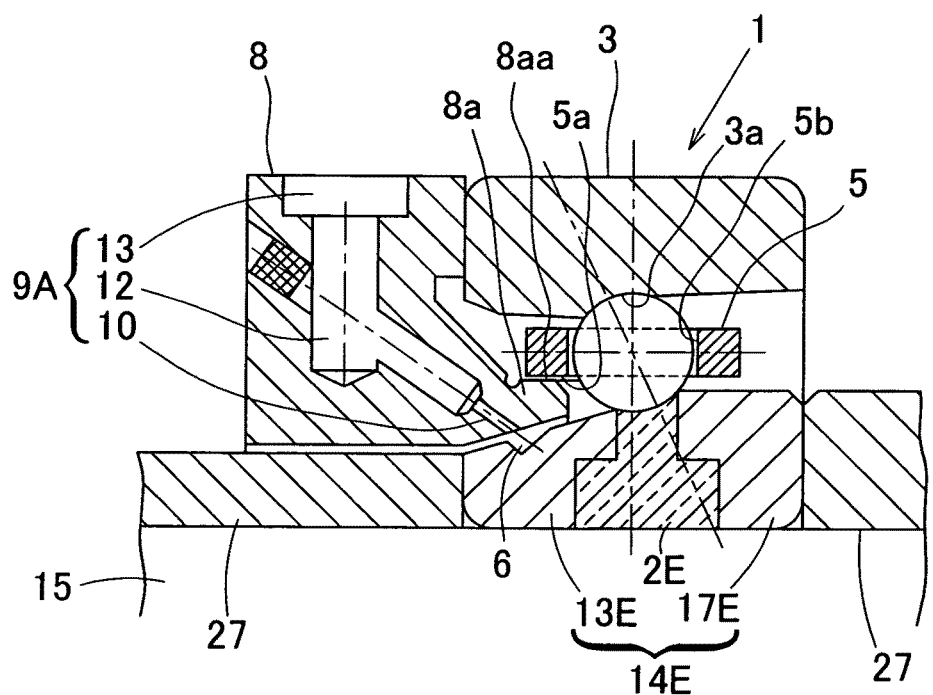
FIG. 13 is a sectional view showing a portion of a rolling bearing device according to a twelfth embodiment of the present invention.

The rolling bearing device according to a twelfth embodiment of the present invention shown in FIG. 13 is similar to that shown in and described with particular reference to FIG. 4, but differs therefrom in that in place of the inner ring 2 employed in the rolling bearing device of FIG. 4, which is the angular contact ball bearing device, an inner ring and spacer combination 14E including an inner ring 2E and two inner ring spacers 13E and 17E on respective sides of the inner ring 2E is employed. The inner ring 2E is made of a ceramic material such as a sintered element containing silicon nitride as a principal component, or a sintered element containing β sialon as a principal component expressed by the composition formula of $Si_{6-z}Al_zO_zN_{8-z}$ where z satisfies $0.1 \leq z \leq 3.5$, and the inner ring spacers 13E and 17E are made of a bearing steel or any other suitable ferrous material.

Even where the rolling bearing device is an angular contact ball bearing device, as is the case with the rolling bearing device which is a cylindrical roller bearing device, the inner diameter surface of the inner rings 2E is fitted on the shaft 15 under interference fitting and the respective collar portions 13a and 17a of the inner ring spacers 13E and 17E are so assembled as to apply the radially acting compressive stress to the shoulder portion 2c of the inner ring 2E. Accordingly, effects similar to those afforded by the rolling bearing device, which is the cylindrical roller bearing device, can be obtained.

Although in any one of the fifth to twelfth embodiments shown in and described with particular reference to FIGS. 6 to 13, respectively, only the inner ring 2A, 2B, 2C, 2D and 2E is made of the ceramic material, the rolling elements 4 also may be made of a ceramic material. When the rolling elements 4 are made of the ceramic materials, it is advantageous in the preload excess resulting from thermal expansion or centrifugal expansion during the high speed rotation as is the case in which the inner ring 2A, 2B, 2C, 2D and 2E is made of the ceramic material, and, therefore, the bearing device can be designed to operate at a further high speed. In such case, for the purpose of convenience in manufacturing, the inner ring 2A, 2B, 2C, 2D and 2E and the rolling elements 4 may be made of different kind of ceramic materials.

Figure 14:
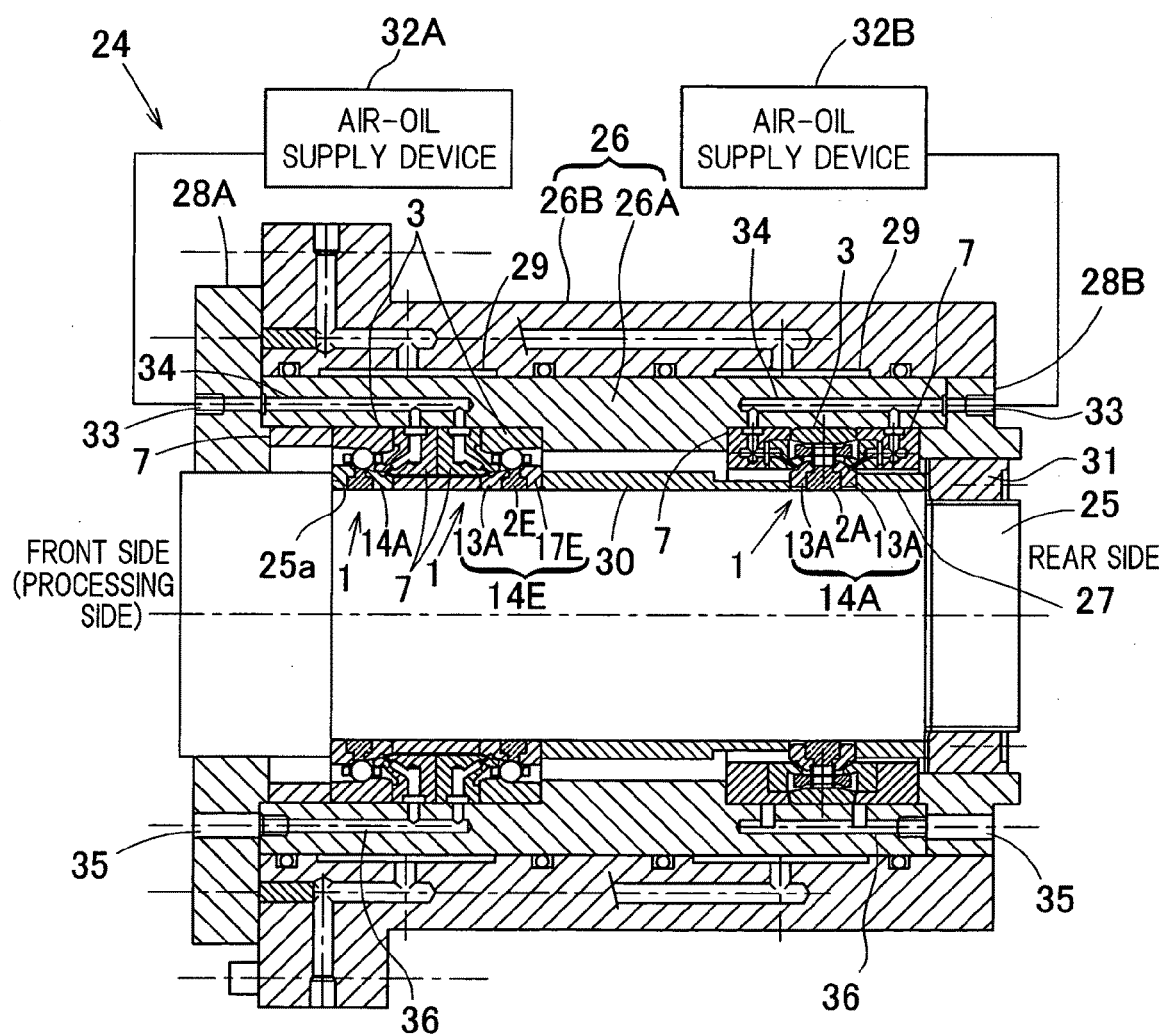
FIG. 14 is a structural diagram showing the spindle device equipped with the rolling bearing device shown in FIGS. 6 to 13.

FIG. 14 illustrates a version of the rolling bearing device, in which one of the rolling bearing devices, which supports a front side of the spindle 25 employed in the high speed spindle device shown in and described with reference to FIG. 5, is replaced with the rolling bearing device according to the twelfth embodiment shown in and described with reference to FIG. 13 and the other of the rolling bearing devices, which supports a rear side of the spindle 25, is replaced with the rolling bearing device according to the fifth embodiment shown in and described with reference to FIG. 6. In place of the rolling bearing device shown and described with reference to FIG. 6, the rolling bearing device shown in and described with reference to any one of FIGS. 7 to 12 (the sixth to eleventh embodiments) may be employed.

In general, the machine tool spindle is operated with the inner ring rotating and the outer ring held standstill and makes use of a structure for cooling the spindle system by cooling the bearing housing 26 provided on an outer diametric side of the outer ring 3. Accordingly, the heat dissipating property on the side of the inner ring is low. Also, recently it is quite often to drive the spindle 25 with a built-in motor system, in which the spindle 25 (15) is integrated within the spindle and, therefore, there is a tendency that a high temperature environment is apt to be created on the side of the inner ring as a result of heat generation of the motor. This tendency is conspicuous particularly during the high speed rotation. When for the support of such a spindle 25 of the machine tool the rolling bearing device is employed, in which the inner ring 2A, 2B, 2C, 2D and 2E is made of the ceramic material, a further high speed feature can be accomplished.

Hereinafter, the details of the sintered element containing β sialon as a principal component will be explained.

This sintered element is intended to encompass a sintered element containing β sialon as a principal component with the balance being impurities or a sintered element containing β sialon as a principal component with the balance being a sintering assistant and impurities. The impurities referred to above include indispensable impurities such as, for example, those originating from a raw material and/or admixed during the manufacture. For the sintering assistant, at least one or more of oxides, nitrides or oxynitrides of magnesium (Mg), aluminum (Al), silicon (Si), titanium (Ti) or rare earth elements may be employed. It is to be noted that the sintering assistant employed in the sintered element may be in a quantity not greater than 20 wt %.

Figure 15:
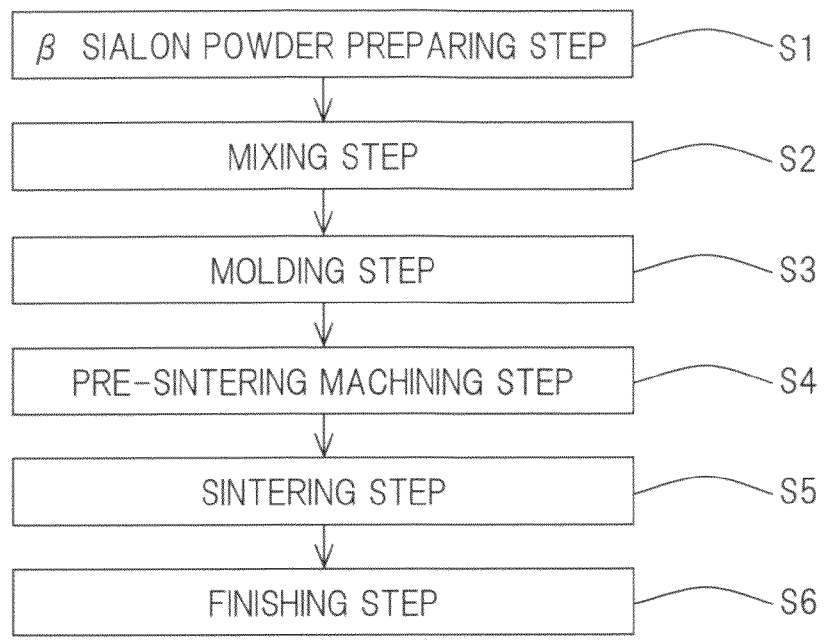
FIG. 15 is a diagram showing schematically a method of making an inner ring using a sintered element containing β sialon as a principal component.

FIG. 15 illustrates a method of making the inner ring 2A made of the sintered element containing β sialon as a principal component.

A β sialon powder preparing step S1 is a step during which a powder of β sialon is prepared. By way of example, the use of a burning synthesizing method makes it possible to manufacture the powder of β sialon inexpensively.

A mixing step S2 is a step during which the β sialon powder prepared during the β sialon preparing step S1 is added and mixed with a sintering assistant. Where no sintering assistant is added, this step may be dispensed with.

A molding step S3 is a step during which the β sialon powder or the mixture of the β sialon powder and the sintering assistant is molded to a shape generally similar to the shape of the inner ring 2A. More specifically, a molding technique such as, for example, a press molding technique, a cast molding technique, an extrusion molding technique or a rolling pelletizing technique may be applied to the β sialon powder or the mixture of the β sialon powder with the sintering assistant to provide a molded body shaped to the shape generally similar to the inner ring 2A.

A pre-sintering machining step S4 is a step during which the molded body referred to above is surface-machined so that after sintering of the molded body, such molded body can assume a shape as close to the desired shape of the inner ring 2A as possible. More specifically, by the use of a machining technique such as, for example, a green body machining, the molded body is molded to a shape as close to the shape of the inner ring 2A as possible after the sintering. This pre-sintering machining step S4 may be dispensed with if at the state the molded body has been shaped during the molding step S3, the molded body after the sintering can exhibit a shape as close as possible to the desired shape of the inner ring 2A.

A sintering step S5 is a step during which the molded body referred to above is sintered under a pressure of not higher than 1 MPa. More specifically, the sintered body having a shape generally similar to the shape of the inner ring 2A is prepared by heating to sinter with the use of a heating method such as, for example, a heater heating or electromagnetic wave heating using microwaves or millimetric waves.

A finishing step S6 is a step during which a finishing process is applied to the sintered body prepared during the sintering step S5 to complete the inner ring 2A. More specifically, the inner ring 2A is completed by grinding a surface of the sintered body prepared during the sintering step S5.

After the sintering performed during the sintering step S5, in a region of the sintered body about 50 μm deep from the surface thereof, a dense layer having a denseness higher than that of inner portion of the sintered body, in which when the section thereof is observed under oblique lighting with the use of an optical microscope, a white region observed as a white colored region has a surface area ratio of not higher than 7%, is formed. Further, in a region of the sintered body about 150 μm deep from the surface thereof, a highly dense layer having a denseness further higher than that of the other portion of the dense layer, in which when the section thereof is observed under oblique lighting with the use of an optical microscope, a white region observed as a white colored region has a surface area ratio of not higher than 3.5%, is formed. Accordingly, during the finishing step S6, the thickness of the sintered body removed may be not greater than 150 μm particularly in the region which will be used as the raceway. By so doing, the highly dense layer can be left in the region containing the inner ring raceway 2a, to thereby increase the rolling fatigue life of the inner ring 2A.

A series of experiments were conducted to examine conditions of formation of the dense layer and the highly dense layer in the section of the sialon sintered body. The experiments were conducted in the following manner.

In the first place, a cubic test sample piece with one side about 10 mm in length was prepared according to a method similar to the method of making the inner ring shown in and described with reference to FIG. 15, with the use of a commercially available powder ("MERAMIX" manufactured by and available from ISMAN J Corporation) of β sialon prepared by the burning synthesizing method, which sialon has the composition of $Si_5AlON_7$. The specific manufacturing method is as follows. At the outset, the powder of β sialon granulated to the submicron order, an aluminum oxide ("AKP30" manufactured by and available from Sumitomo Chemical Co., Ltd.) as a sintering assistant and yttrium oxide ("Yttriumoxide grade C" manufactured by and available from H.C. Starck Ltd.) were mixed by a wet mixing method with the use of a ball mill. Thereafter, granulation was performed with a spray dryer to provide a granulated powder. The resultant granulated powder was then molded to a predetermined shape with the use of a die, followed by pressurization through a cold isostatic molding (CIP) to thereby provide a molded body. The molded body was subsequently heated and sintered at 1650° C. under the nitrogen atmosphere of 0.4 MPa in pressure to thereby complete the cubic test sample piece referred to above.

After the resultant test sample piece had been cut and a cut surface of the test sample piece had been lapped by the use of a diamond lapping machine, a mirror surface lapping was performed with the use of a chromium oxide lapping machine to thereby prepare the section of the test sample piece, including a center of the cube, for observation purpose. Using an optical microscope ("Microphoto-FAX" manufactured by and available from Nikon Corporation), the test sample piece section was observed under oblique lighting and photo-taken at 50 magnification factor in an instant film ("FP-100B" manufactured by and available from Fuji Film Corporation). An image of the resultant micrograph was scanned (at 300 DPI in resolution) with the use of a commercially available scanner and was then captured into a personal computer. The image captured into the personal computer was digitalized according to the brightness threshold (140 employed in the practice of this experiment) with the use of an image processing application software ("WinROOF" available from Mitani Corporation), followed by measurement of the surface area ratio of the white region.

Figure 16:
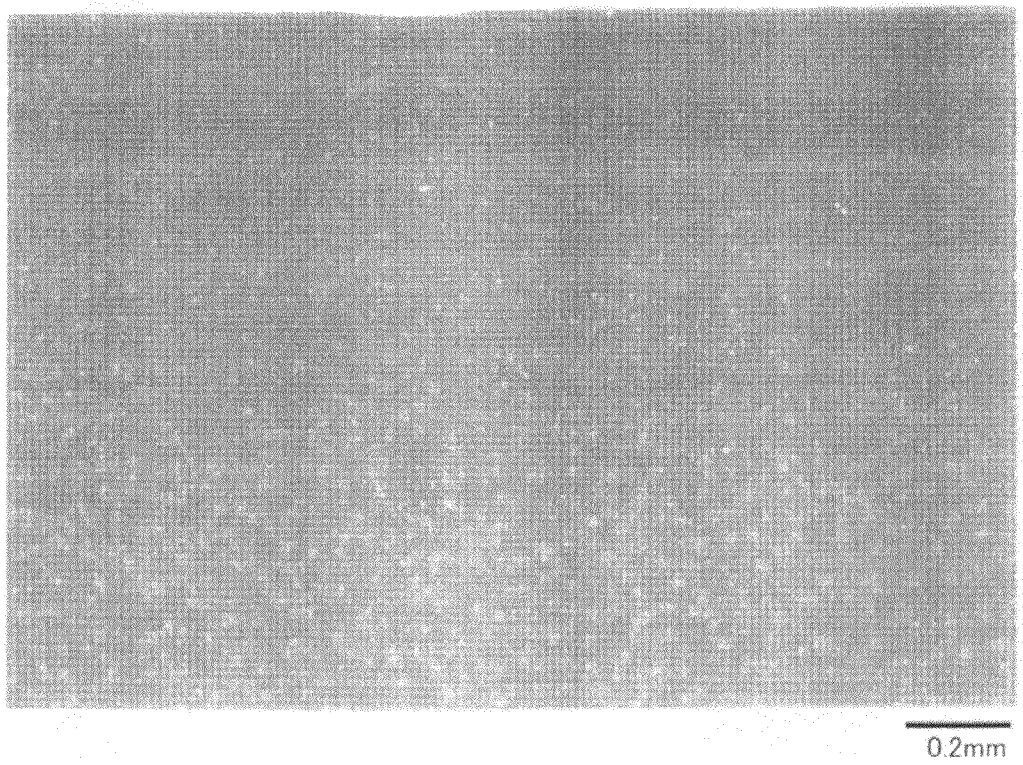
FIG. 16 is a micrograph showing an observational section of a test sample piece, taken by an optical microscope under oblique lighting.
Figure 17:
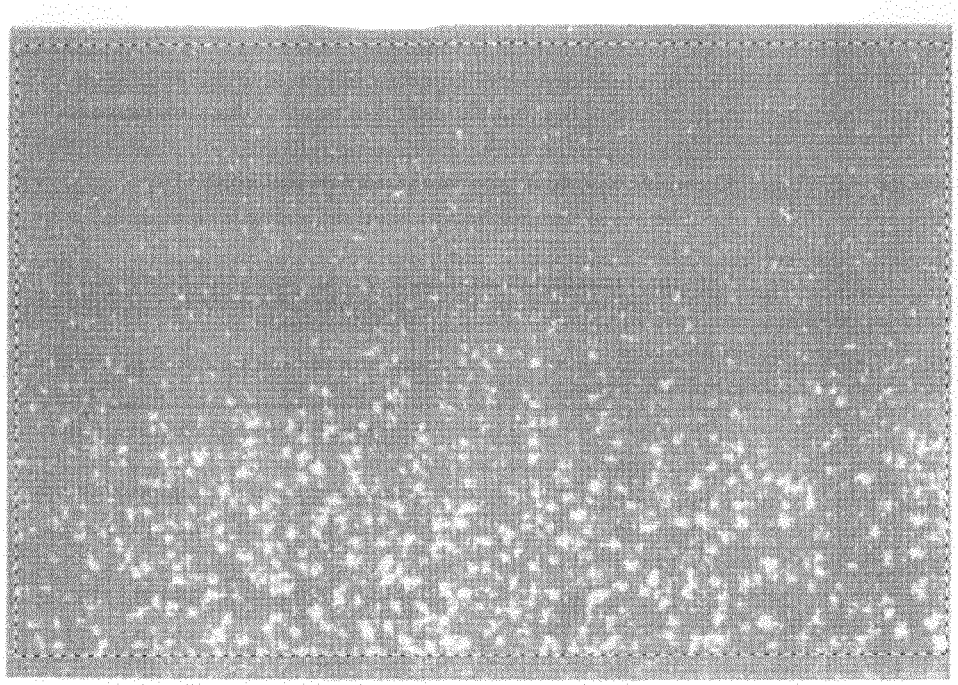
FIG. 17 illustrates an example showing the image of the micrograph, shown in FIG. 16, which has been digitalized by a brightness threshold with the use of an image processing application software.
Figure 18:
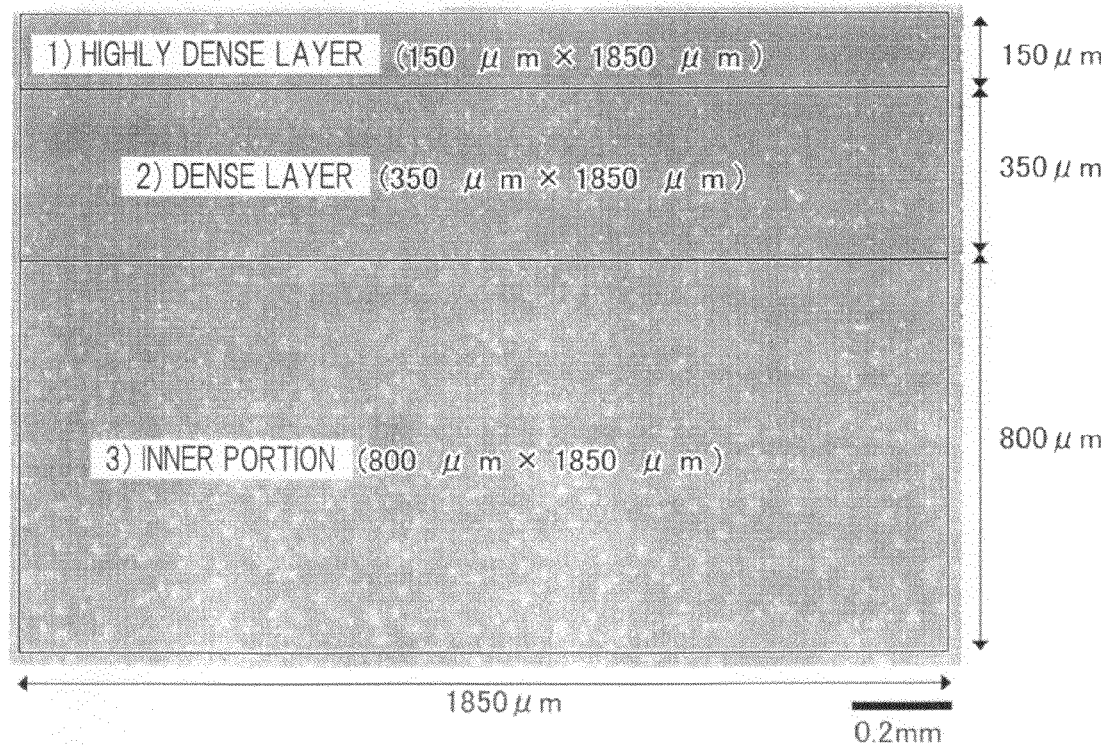
FIG. 18 is a diagram showing a region (evaluation region) in which the image processing is performed when the image of the micrograph shown in FIG. 16 is digitalized with the use of the image processing application software.

The result of experiments will now be discussed. FIG. 16 is a micrograph showing the section of a test sample piece so observed, which was taken by an optical microscope under oblique lighting. Also, FIG. 17 illustrates an example showing the image of the micrograph, shown in FIG. 16, which had been digitalized according to the brightness threshold with the use of the image processing application software. Yet, FIG. 18 is a diagram showing a region (evaluation region) in which the image processing was performed when the image of the micrograph shown in FIG. 16 was digitalized with the use of the image processing application software. In FIG. 15, an upper side of the micrograph is on the processing side and an upper end represents a surface.

Referring to FIGS. 16 and 17, it will be readily understood that the test sample piece prepared by the method similar to the method of making the inner ring shown in and described with reference to FIG. 15 is formed in a region including the surface, with a layer having a white region smaller than that within the inner portion thereof. And, as shown in FIG. 18, when the image of the micrograph so photo-taken was divided into three regions (the region within the distance of 150 μm deep from the outermost surface, the region within the distance of 150 to 500 μm, and the region within the distance of 500 to 800 μm) and was analyzed for each region to determine the surface area ratio of the white region, such results as shown in Table 1 could be obtained. In Table 1, each of the regions shown in FIG. 18 is taken as one field of view and the average value and the maximum value of the surface area ratios of the white region in the five fields of view obtained from five micrographs photo-taken at random are shown.

TABLE 1

| | Depth from Outermost | Surface Area Ratio of White Region (%) | |
|---|---|---|---|
| | Surface (μm) | 5 Fields of View Average | 5 Fields of View Maximum |
| 1) Highly dense layer | 150 | 1.2 | 3.5 |
| 2) Dense layer | 15-500 | 3.7 | 7.0 |
| 3) Inner Portion | >500 | 18.5 | 22.4 |

Referring to Table 1, it has been found that the surface area ratio of the white region in the test sample piece was 18.5% at the inner portion, but 3.7% in the region spaced a distance of not greater than 500 μm deep from the surface and 1.2% in the region spaced a distance of not greater than 150 μm deep from the surface. Those data make it clear that the test sample piece prepared by the method similar to the method of making the inner ring shown in and described with reference to FIG. 15 is effective to form in the region including the surface, the highly dense layer and the dense layer in which the white region is smaller than that in the inner portion.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rolling bearing device which comprises:
   a rolling bearing unit including an inner ring and an outer ring both formed with respective raceways, rolling elements retained by an annular retainer and interposed between respective raceways in the inner and outer rings, and a retainer that retains the rolling elements; and
   a nozzle member provided in the vicinity of the outer ring;
   wherein the nozzle member is provided with an annular collar portion having a nozzle hole defined therein for a lubricant and being inserted in a bearing space delimited between the inner ring and the outer ring, and the collar portion has an outer diametric surface in the form of a retainer guide surface that extends axially on an inner diametric side of the retainer to guide the inner diametric surface of the retainer.

2. The rolling bearing device as claimed in claim 1, wherein the inner ring has an outer diametric surface formed with an inclined surface portion having a large diameter on the side of the raceway, and the nozzle hole provided in the collar portion of the nozzle member is formed so as to discharge the lubricant in a direction towards the inclined surface portion of the inner ring.

3. The rolling bearing device as claimed in claim 1, wherein the nozzle hole provided in the collar portion of the nozzle member is formed so as to discharge the lubricant in a direction towards the inner diametric surface of the retainer.

4. The rolling bearing device as claimed in claim 3, wherein the nozzle hole is provided with a restrictor portion.

5. The rolling bearing device as claimed in claim 3, wherein the outer diametric surface of the inner ring is formed as an inclined surface portion and an inner diametric surface of the collar portion includes an inclined surface extending along the outer diametric surface of the inner ring.

6. The rolling bearing device as claimed in claim 1, wherein the nozzle member is provided with a plurality of the nozzle holes at respective circumferential locations in the collar portion.

7. The rolling bearing device as claimed in claim 1, the nozzle hole of the nozzle member discharges the lubricant in the form of an air-oil.

8. The rolling bearing device as claimed in claim 1, which is used to support a spindle of a machine tool.

9. The rolling bearing device as claimed in claim 1, wherein the inner ring is made of a ceramic material.

10. The rolling bearing device as claimed in claim 9, wherein the ceramic material is a sintered element containing silicon nitride as a principal component.

11. The rolling bearing device as claimed in claim 9, wherein the ceramic material is a sintered element containing, as a principal component, β sialon which is expressed by the composition formula of $Si_{6-z}Al_zO_zN_{8-z}$ where z satisfies $0.1 \leq z \leq 3.5$.

12. The rolling bearing device as claimed in claim 9, wherein the rolling elements are made of a ceramic material of a kind different from that used to form the inner ring.

13. The rolling bearing device as claimed in claim 9, wherein the inner ring has a shoulder portion positioned on an axially outer side of the raceway, the shoulder portion being mounted with an inner ring spacer having an inner diametric surface fitted to an outer diametric surface of the shoulder, the inner ring spacer applying a radially acting compressive force to the shoulder portion of the inner ring.

14. The rolling bearing device as claimed in claim 9, wherein the inner ring has a shoulder portion positioned on an axially outer side of the raceway, the shoulder portion having an outer periphery bound by a fibrous member composed of circumferentially extending fibers to thereby apply a radially acting compressive force to the shoulder portion of the inner ring.

15. The rolling bearing device as claimed in claim 9, wherein the inner ring has a shoulder portion positioned on an axially outer side of the raceway, the shoulder portion being mounted with an inner ring spacer having an inner diametric surface fitted to an outer diametric surface of the shoulder, and wherein a shaft is fitted to an inner periphery of the inner ring and an inner periphery of the inner ring spacer, the inner ring and the shaft being engaged under interference fitting and the inner ring spacer and the shaft being engaged under clearance fitting, to thereby apply a radially acting compressive force to the shoulder portion of the inner ring.

\* \* \* \* \*